(12) United States Patent
Evald et al.

(10) Patent No.: US 10,150,036 B2
(45) Date of Patent: Dec. 11, 2018

(54) APPARATUS AND METHOD FOR PROVIDING A COMPUTER IMPLEMENTED GAME

(71) Applicant: KING.COM LIMITED, St. Julians (MT)

(72) Inventors: Martin Evald, Stockholm (SE); Erik Bystrom, Stockholm (SE)

(73) Assignee: KING.COM LTD., St. Julians (MT)

( * ) Notice: Subject to any disclaimer, the term of this patent is extended or adjusted under 35 U.S.C. 154(b) by 313 days.

(21) Appl. No.: 14/555,896

(22) Filed: Nov. 28, 2014

(65) Prior Publication Data

US 2015/0174489 A1 Jun. 25, 2015

(30) Foreign Application Priority Data

Nov. 27, 2013 (GB) .................................... 1320963.0
Nov. 30, 2013 (GB) .................................... 1321161.0

(51) Int. Cl.
*A63F 13/52* (2014.01)
*A63F 13/47* (2014.01)

(52) U.S. Cl.
CPC .............. *A63F 13/52* (2014.09); *A63F 13/47* (2014.09)

(58) Field of Classification Search
CPC ................................. A63F 13/47; A63F 13/52
See application file for complete search history.

(56) References Cited

U.S. PATENT DOCUMENTS

| | | | | |
|---|---|---|---|---|
| 6,261,179 B1* | 7/2001 | Miyamoto | ............... | A63F 13/10 463/23 |
| 2010/0197389 A1* | 8/2010 | Ueda | ....................... | A63F 13/12 463/30 |
| 2013/0344953 A1* | 12/2013 | Yoshikawa | ............. | A63F 13/12 463/29 |
| 2014/0080556 A1* | 3/2014 | Knutsson | ................ | A63F 13/12 463/7 |
| 2014/0094317 A1* | 4/2014 | Takagi | .................... | A63F 13/12 463/42 |

OTHER PUBLICATIONS

Fahey, Mike. Plants Vs Zombies 2 Is Free-To-Play Thats Better Without Paying [online]. Aug. 15, 2013 [retrieved on Dec. 10, 2016]. Retrieved from the Internet <URL: http://kotaku.com/plants-vs-zombies-2-is-free-to-play-thats-better-with-1147085832>.*
Super Mario World Instruction Booklet [online]. 1991 [retrieved on Dec. 10, 2016]. Retrieved from the Internet:<URL:http://www.gamesdatabase.org/Media/SYSTEM/Nintendo_SNES/manual/Formated/Super_Mario_World_-_1991_-_Nintendo.pdf>.*
Super Mario Bros. 3 Instruction Booklet. [Online]. 1990 [retrieved Dec. 10, 2016]. Retrieved from the Internet:<URL:http://www.gamesdatabase.org/Media/SYSTEM/Nintendo_NES//Manual/formated/Super_Mario_Bros._3_-_1990_-Nintendo.pdf>.*
Shea, Cam. Plants vs. Zombies 2 Review [online]. IGN, Jul. 17, 2013 [retrieved on Nov. 5, 2017]. Retrieved from the Internet: <URL: http://www.ign.com/articles/2013/07/17/plants-vs-zombies-2-review>.*

* cited by examiner

*Primary Examiner* — David Duffy
(74) *Attorney, Agent, or Firm* — Saul Ewing Arnstein & Lehr LLP

(57) ABSTRACT

A computer device has a user interface configured to receive an input from a user. The device also has a display configured to display game elements for engagement by a user via the user interface to allow the user to play a game. A processor is provided which is configured to control the display to display at least one of two different progress paths through a game. Each of the progress paths comprises a plurality of different game levels.

23 Claims, 31 Drawing Sheets

APPARATUS AND METHOD FOR PROVIDING A COMPUTER IMPLEMENTED GAME

CROSS-REFERENCE TO RELATED APPLICATIONS

This application is based on, and claims priority to GB Application No. GB 1320963.0, filed Nov. 27, 2013, and GB Application No. GB 1321161.0, filed Nov. 30, 2013, the entire contents of each of which being fully incorporated herein by reference.

FIELD OF THE INVENTION

Some embodiments may relate to an apparatus and method for providing a computer implemented game.

BACKGROUND OF THE INVENTION

Computer implemented games are a well-known category of games that allow a player to interact with a computing device to cause the processor to perform certain functions and typically display a result on a screen or other display device.

Different types of games have evolved from classical arcade games in to games that can be played on a handheld device such as a smartphone, tablet or personal computer. Some games are also connected to the Internet and the player can play against or compare score with other users in multiplayer mode.

There are multiple technical challenges facing the designer of computer-implemented games.

One technical challenge can involve allowing a game to be fun and compelling even when there is limited display resource available, such as when a game is being played on a smartphone, tablet or other minicomputer. Another challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A 'match-3 game' is a type of casual puzzle game where the player is required to find patterns on a game board. The player then has to match three or more of the same type of game element on the game board and those matched elements will then disappear.

One variant of casual games are the so called 'clicker' games where the player can click on a group of adjacent game elements of a certain type and those will then be removed. Some clicker games only require two adjacent objects to remove those elements if clicked by the user.

Another type of match-3 games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so called 'shooter' games where the player launches for instance a ball or bubble on to the game board tying to aim at groups of similar game elements already on the game board. If the launched ball hits or forms a group of more than 3 similar game elements then that group of game elements are removed from the game board. In a typical shooter game the physics of the game board being that the game pieces are falling downwards on the board.

There are also other types of games where groups of certain game elements are combined together and removed once they have reached a certain size. The user can connect the groups with a swiping movement touching each of the connecting elements in one embodiment. In another embodiment the groups are formed into one group when the elements of the same type are adjacent, the player then removes the group for instance by clicking on that group.

This patent specification describes not only various ideas and functions, but also their creative expression. A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

Some embodiments may provide a computer device having: a user interface configured to receive an input from a user; a display configured to display game elements for engagement by a user via the user interface to allow the user to play a game; and a processor configured to control the display to display at least one of two different progress paths through a game, each of said progress paths comprising a plurality of different game levels.

The two different progress paths may each have corresponding levels.

In some embodiments, the user device may comprise a memory, the corresponding levels of the different progress paths comprise at least a portion of common computer executable code, the memory may be configured to store said code.

In some embodiments, the processor may be configured to provide, when the game is played, each of the levels on one progress path with at least one additional goal as compared to the corresponding level on the other progress path.

The processor may be configured to cause the display to display a plurality of game elements in a game board, each game element having one of a plurality of different characteristics, the user interface may be configured to receive user input and the processor may be configured in response to said user input to cause at least one game element to be removed from said game board and said additional goal comprises balancing a number of removed game elements with one characteristic with a number of removed game elements of a different characteristic.

The different characteristics may comprise different colour.

One progress path is displayed so as visually opposite the other progress path.

One progress path may be a mirror image of the other.

The processor may be configured to allow a user to access one of said dual progression paths only if one or more criteria is satisfied.

The one or more criteria may comprise one or more of: a number of levels have been completed, a number of other users have been beaten, a number of rewards for completing one or more levels; and a given score.

The processor may be configured such that at least one progression path comprises a plurality of stages, each stage comprises a plurality of levels and each stage has a least one criteria for unlocking stage in addition to completion of levels in a preceding stage.

The at least one criteria may comprise one or more of: a number of levels have been completed, a number of other users have been beaten, a number of rewards for completing one or more levels; and a given score.

The user interface and said display may be provided by a touch screen.

In some embodiments, the processor may be provided by a plurality of processors. In some embodiments, the processor or plurality of processors may provide a game engine.

The processor may be configured to determine which of said plurality of progress paths through a game is active and to cause the display to display the active progress path.

The processor may be configured to determine which of said levels in said active path are available and to cause the display to display the active progress path with an indication as to which levels are available for a user to play.

The processor may be configured to cause the display to display only the active progress path.

In some embodiments, a computer implemented method may be provided, the method comprising the following steps implemented by a computer device having at least one processor, a display and a user interface: displaying game elements for engagement by a user for playing a game; and receiving an input from a user responsive to engagement with said game elements; and displaying at least one of two different progress paths through a game, each of said progress paths comprising plurality of different game levels.

The two different progress paths may each have corresponding levels.

In some embodiments, the corresponding levels of the different progress paths comprise at least a portion of common computer executable code, the method comprising executing said code.

Each of the levels on one progress path may be provided with at least one additional goal as compared to the corresponding level on the other progress path.

The method may comprise displaying a plurality of game elements in a game board, each game element having one of a plurality of different characteristics, receiving user input and in response to said user input causing at least one game element to be removed from said game board and said additional goal comprises balancing a number of removed game elements with one characteristic with a number of removed game elements of a different characteristic.

The different characteristics may comprise different colour.

The method may comprise displaying one progress path so as visually opposite the other progress path.

One progress path may be a mirror image of the other.

The method may comprise allowing a user to access one of said dual progression paths only if one or more criteria is satisfied.

The one or more criteria may comprise one or more of: a number of levels have been completed, a number of other users have been beaten, a number of rewards for completing one or more levels; and a given score.

At least one progression path comprises a plurality of stages, each stage comprises a plurality of levels and each stage has a least one criteria for unlocking stage in addition to completion of levels in a preceding stage.

The at least one criteria may comprise one or more of: a number of levels have been completed, a number of other users have been beaten, a number of rewards for completing one or more levels; and a given score.

The user interface and said display may be provided by a touch screen.

The method may comprise determining which of said plurality of progress paths through a game is active and displaying the active progress path.

The method may comprise determining which of said levels in said active path are available and displaying the active progress path with an indication as to which levels are available for a user to play.

The method may comprise displaying only the active progress path.

Some embodiments may provide a method for interaction between players in a game or game platform, the game having the option of being connected to a social network and having the option of letting players send help to each other, the method comprising: providing a bulletin board in which a first player can make requests for help and see requests made by other players asking for help, the players asking for help not being in any way previously connected with the first player.

The method may provide a way of asking other players for help without specifying from which players help is requested.

The method may provide a way for players to respond to a help request sent by another player.

The method may provide a way of providing help to a player after another player has agreed to help.

Some embodiments may provide a method for interaction between players in a game, the game having the option of being played on a mobile device and having the option of letting players send help to each other, the method comprising: a bulletin board in which a first player can make requests for help and see requests made by other players asking for help, the players asking for help not being in any way previously connected with the first player.

The method may provide a way for players to choose a name and picture for interacting with other players The method may provide a way of asking other players for help without specifying from which players help is requested.

The method may provide a way for players to respond to a help request sent by another player.

The method may provide a way of providing help to a player after another player has agreed to help.

The help asked for may be lives.

The help asked for may be to pass a certain point in a game.

The help asked for may be for extra moves.

A player may make one request of any kind without providing help to another player first.

A player may have to help another player before being able to make a second request.

The bulletin board may be accessible from the map view.

A player may only allowed to help another player once in a certain period of time.

A player may only allowed to help another player once every two hours.

A player may be rewarded for helping another player.

The kind of requested help may be denoted by icons corresponding to the help requested.

BRIEF DESCRIPTION OF THE DRAWINGS

Reference is now made by way of example only to the accompanying drawings in which.

DETAILED DESCRIPTION OF THE INVENTION

In the following description of various embodiments, reference is made to the accompanying drawings which form a part thereof, and in which is shown by way of illustration various embodiments may be utilized.

The terms user and player are used interchangeably throughout this document and no specific meaning is intended using one or the other unless the context suggests otherwise.

Figure 1:
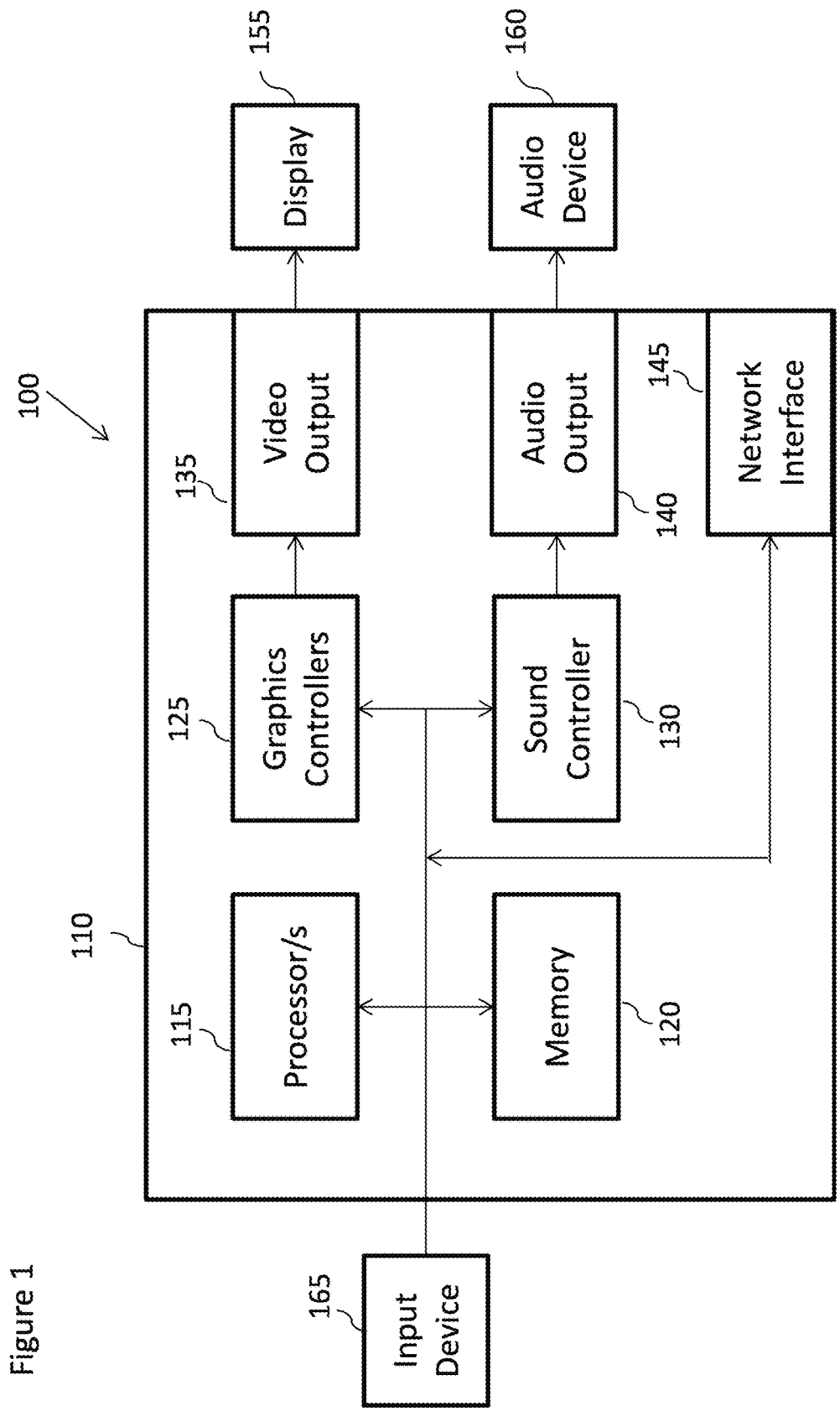
FIG. 1 shows a user device in which some embodiments may be provided.

A schematic view of a user device 100 according to an embodiment is shown in FIG. 1. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The control part 110 has an interface 145 allowing the device to be able to communicate with a network such as the Internet or other communication infrastructure.

The video output 135 is provided to a display 155. The audio output 140 is provided to an audio device 160 such as a speaker and or earphone(s).

The device 100 has an input device 165. The input device can take any suitable format and can be one or more of a keyboard, audio input, mouse, touch screen, joystick or game controller. It should be appreciated that the display 155 may in some embodiments also provide the input device 165 by way of an integrated touch screen for example.

The blocks of the control part 110 are configured to communicate with each other by an interconnect such as a bus or any other suitable interconnect and/or by point to point communication. The blocks of the controller may be implemented in any suitable way. The blocks of the controller may be regarded as schematically showing one or more functions performed by the control part 110.

It should be appreciated that in some embodiments, the control part may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
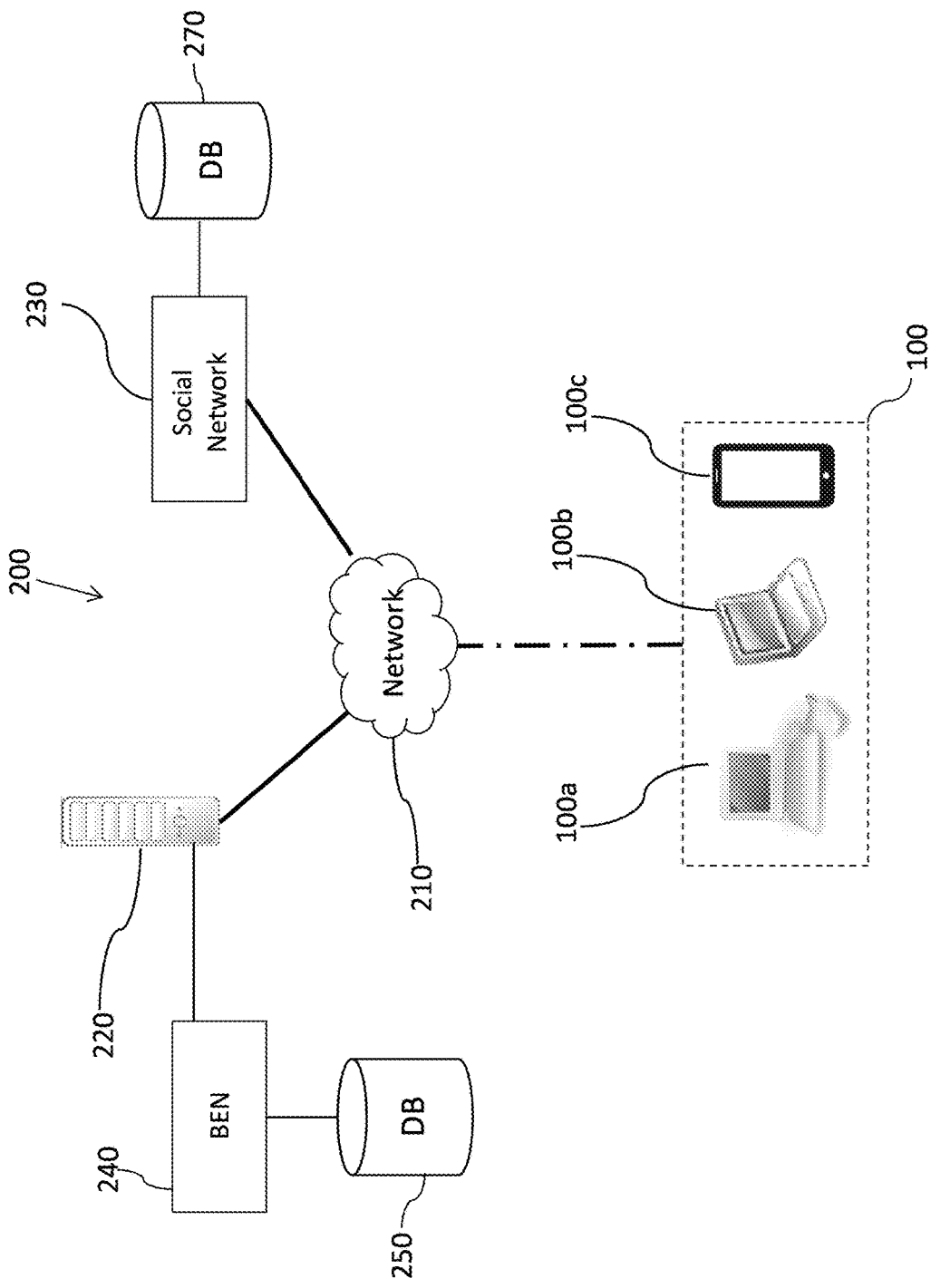
FIG. 2 shows an example system in which some embodiments may be provided.

FIG. 2 schematically shows a system 200 according to an embodiment. The system 200 comprises a server 220 which may store or be in communication with database 250. A back end infrastructure (BEN) may be provided between the database 250 and the server 220. The database may store one or more of game player's details, profiles, statistics etc. In practice, one or more databases 250 may be provided. Where more than one server 220 is provided, the database(s) 250 may be provided in one database 250 or across two or more databases. The server 220 may have a games data function. This may comprise one or more units of memory to store the computer game program, user behaviour data and a processor 115 to run the games program and process the user behaviour data.

The server 220 may communicate via, for instance, a communications infrastructure 210 to one or more client or user devices 100, shown in FIG. 2 by way of example as user devices 100a, 100b and 100c. The communications infrastructure may be the Internet or the like. The communications infrastructure may provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 200 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device. In that case, the game may be implemented at least partially by a computer program stored in memory on the user device and run by the control part 110.

Over the course of players playing the game, data will be produced. This data can for instance be related to a player's game performance or to game information related to a social network with which the game is connected. It is possible to gather this data, store it and make use of it for instance to improve the game. There can be certain performance indicators used to measure the success of the game. These indicators can for instance relate to player retention, the virality of the game and the revenue of the game.

A person skilled in the art will realise that the different approaches to implementing the game are not exhaustive, what is described herein are certain preferred embodiments. It is possible to implement the game in a number of variations without departing from the spirit or scope of the invention.

Figure 3A:
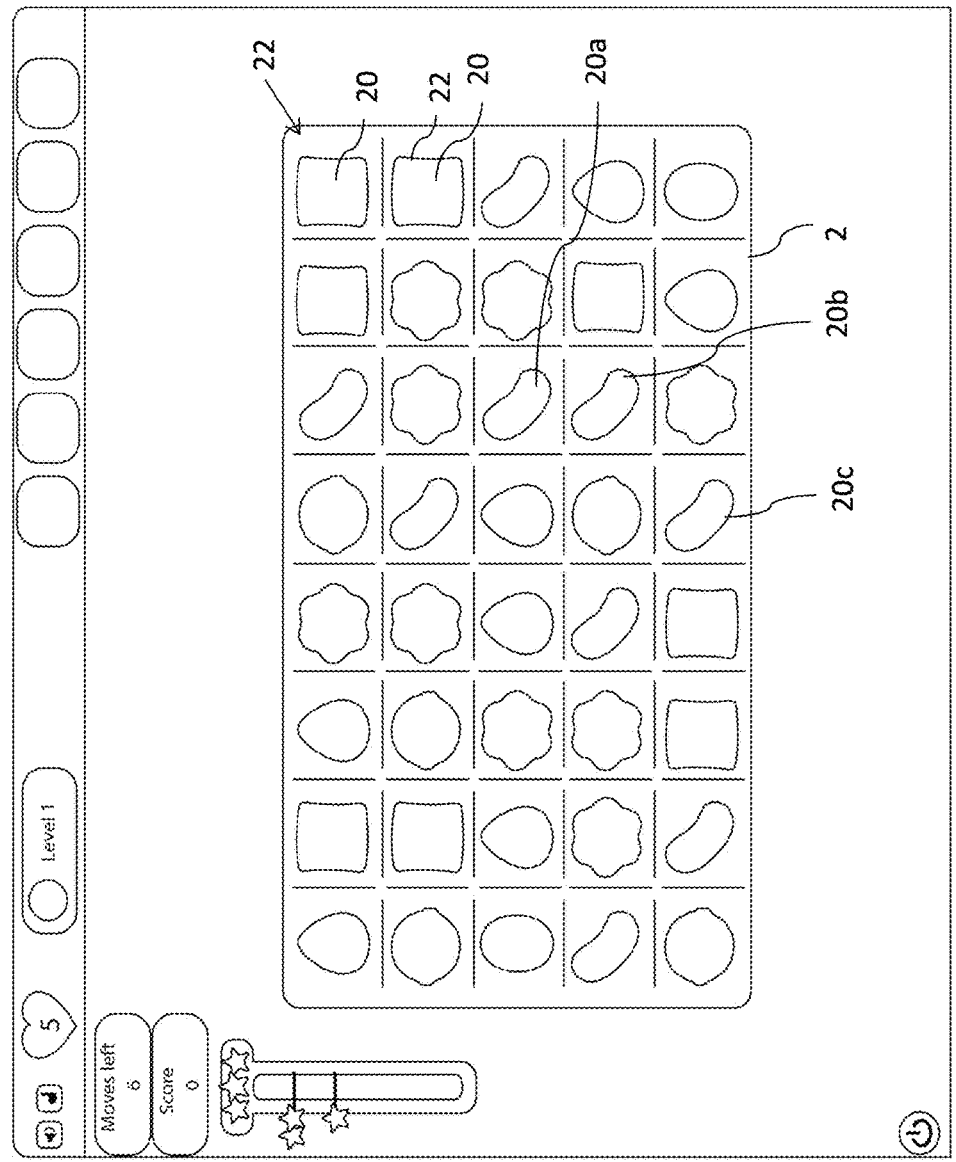
FIGS. 3a and 3b shows a first game board example for a match switcher or clicker game.

FIG. 3*a* shows a display of a match 3 switcher game called Candy Crush Saga™. FIG. 3*a* illustrates a game board 2 with a plurality of game elements 20. The game elements are each of six different shapes and colours. Each game element is supported by a tile 22. The tiles are not readily visible to a player of the game—the game elements are the main focus for a player. However, the tiles govern characteristics of the game elements which are visible to a player as will be described in more detail later.

Figure 3B:
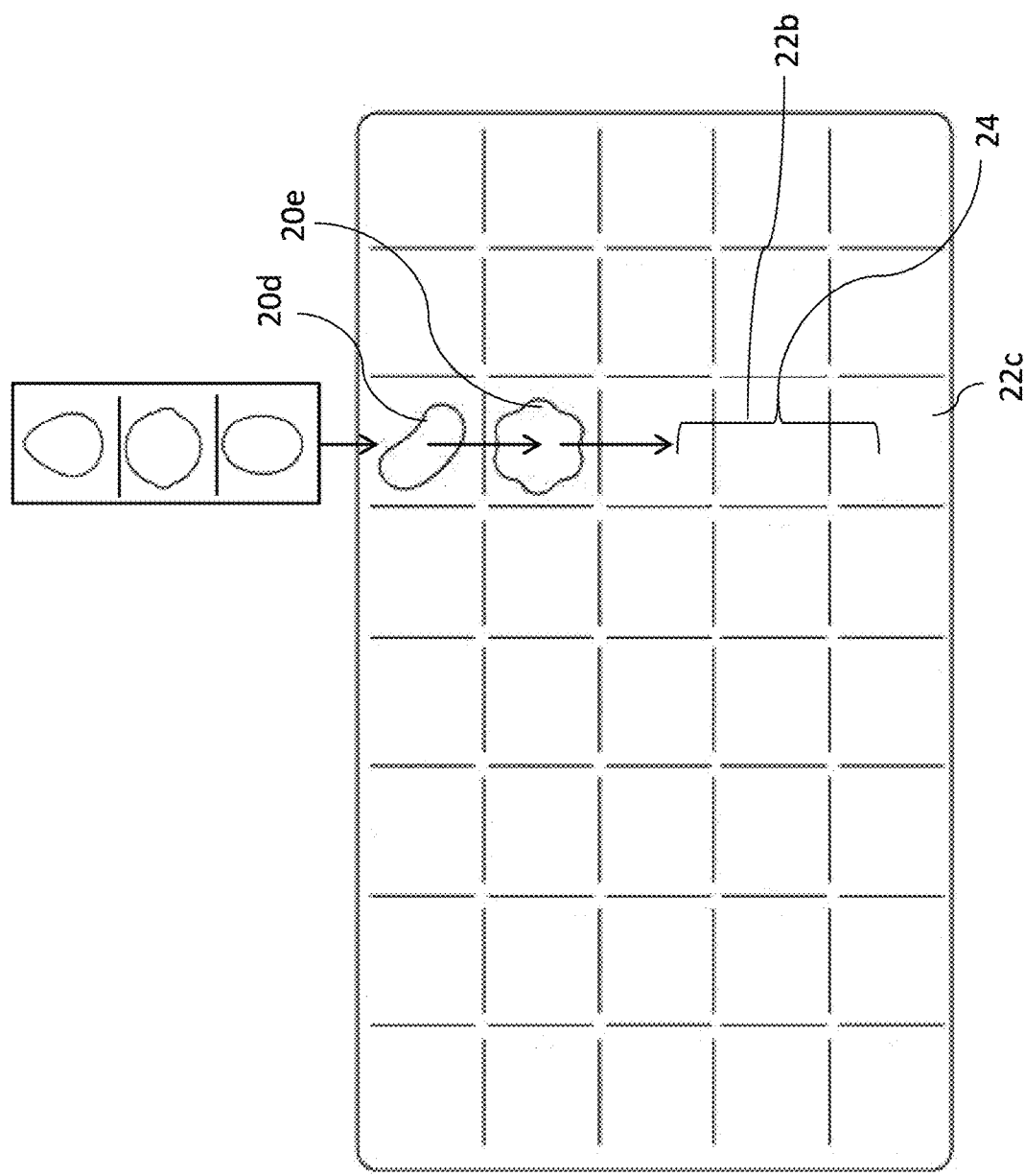

In the known version of the match 3 switcher game, the aim of the game is to swap game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 3*a* that game element 20*c* is moved one place to the right to form a three-line match with game elements 20*a* and 20*b*. Turning now to FIG. 3*b*, this has the effect of game board elements 20*a*, 20*b* and 20*c* "disappearing", creating a visual effect (animation) on the screen to indicate the disappearance, such as a minimal explosion effect denoted 24 in FIG. 2. The two game elements which were directly above game elements 20*a* will now fall downwards into the spaces created by the removal of game elements 20*a*, 20*b* and 20*c*. Thus, game element 20*e* will end up at the location of tile 22*c*, and game element 20*d* will end up at the location of tile 22*b*.

It should be appreciated that other embodiments may be used in the context of any other suitable game, by way of example only, in a clicker or shooter type of game.

The game board layout may vary in different embodiments and may also be different in different levels in the same game.

Thus the game board is populated with game elements. The game elements are from a plurality of different types. The game elements may be visually distinguishable through different colour and/or shape and/or other features.

Figure 4:
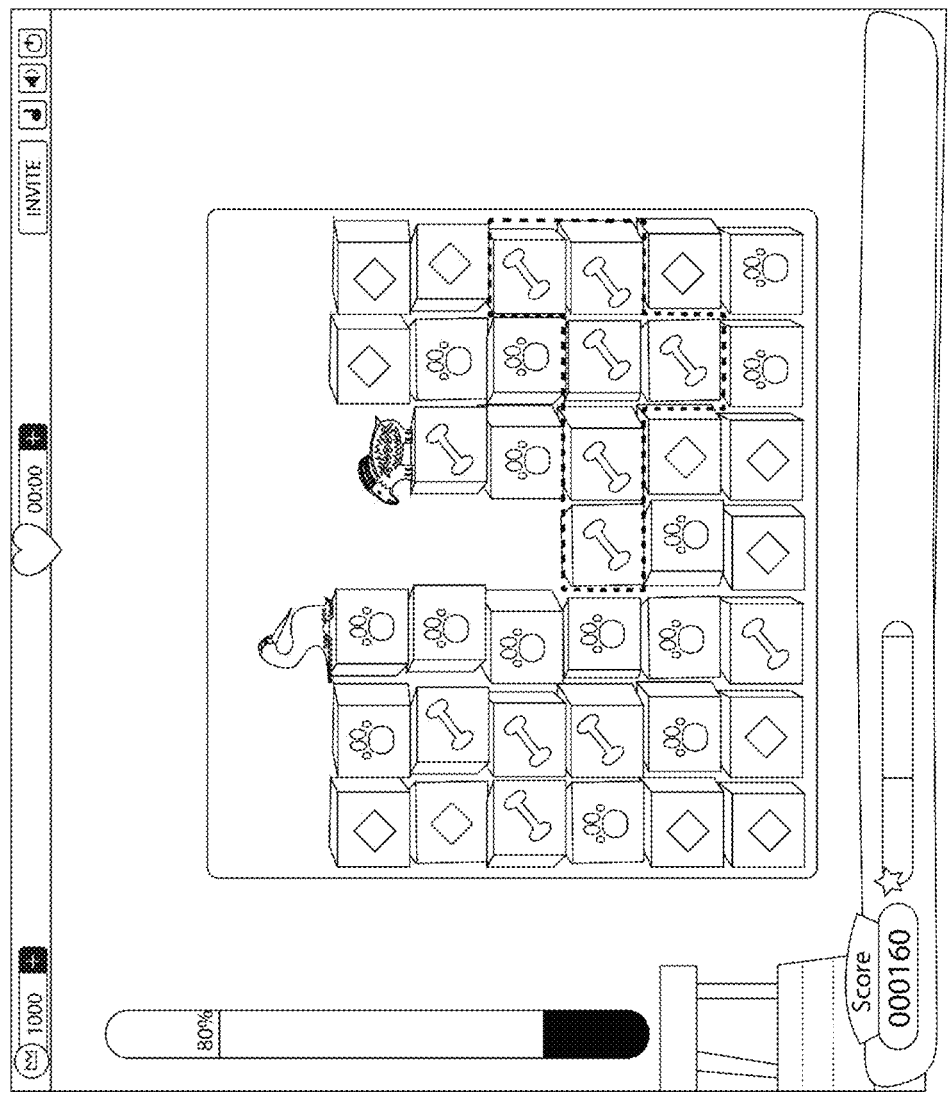
FIG. 4 shows a second game board example for a match switcher or clicker game.

The game may be implemented in different game board layouts as shown in FIG. 4.

In some embodiments, the game may have a plurality of levels. A level is typically completed when the player has reached one or a plurality of goals for the level. By way of example only, the goal may be to reach a certain score within a certain time or within a certain number of moves. The game goal may alternatively or additionally be to get certain game elements to specific locations on the game board or to be moved out from the game board. For the latter goal, the player can achieve that through creating a path of cleared game elements for the specific game element to move on the game board.

In some embodiments, to play a switcher game, game elements of various types are swapped with each other to make moves on a game board such as described above. To gain points the player has to make moves that create matches of for example at least three of the same type of game element. In doing so, the player gains points and the matched game elements are removed. As a result, new game elements are provided in order to fill any empty spaces created.

In some games, only swapping moves that will create at least one combination of at least three game elements of the same type are allowed. However, this will depend on the rules of the game. In some embodiments, a typical game mode of a match-3 game provides the player with a limited number of moves to reach the level target. In some embodiments additional moves can be earned by good gameplay.

The game board may come in various shapes and sizes. An example size is a grid of 9×9 game elements. It should be noted that that in some embodiments, the shape and/or size of the game board may vary between the levels played. This gives more variety to the game compared to many other games in the match-3 genre where the game board always looks the same.

There may be different goals to complete levels. For example, to add more diversity and/or to create a more dynamic game, players may have to fulfil different criteria in order to complete different levels; these are referred to as goals. Each level may have one or more goals that have to be fulfilled in order to complete that level.

By way of example, one goal is to collect a certain amount of points before running out of moves. The points are collected through making matching combinations on the game board. For example, the more complex the combinations made, the more points.

Another goal is to reach a set score before running out of time. The game may also be implemented with timed levels.

The goal that needs to be fulfilled on these levels is to collect a certain amount of points before time runs out.

Another goal is to cause one or more particular game object to be moved from one position to another. For example, this may be bring the game object down to the bottom of a game board. The particular game object may in some embodiments not be matchable with other game elements but they may be switched with other game elements. There may be arrows at the bottom of the game board to indicate where the particular object can fall down. If there is no arrow at the bottom then the particular object cannot fall down that way. In King's Candy Crush Saga, an example of a particular game object is a so-called ingredient.

Another goal is associated with game elements that are found underneath other game elements and need one or two matches on top of them for the game element to be removed. One, more or all of these game elements below other game elements may need to be removed as a goal in some embodiments.

Another type of level have two goals:

Reach target score before running out of moves

Collect certain amount of game elements through specific matches as well as achieving hard to make combos specified on the level played.

Another goal of this game mode is to light up all squares/cells on the game board. In some embodiments, the requirement to light up a cell is to combine a game element that is in that cell. In other embodiments, the player has to combine multiple game elements in the same cell before it lights up. The lighting up occurs when the goal is met.

Another goal, may be to require the combination of game elements in cells adjacent to game board blockers in order to 'dig' down in the level. This allows the player to uncover objects that are covered initially.

One or more of the above goals may be required to be achieved in order to complete a particular level. Any one or more of the game modes described herein can be used in any combination with one another.

Another goal may be to require the collection of an even amount of game elements with different characteristics such as colour by the player to complete the level. The level goal can be indicated with a scale where the game elements with the different characteristics are collected are placed on either side. When the count is unbalanced, one side of a scale starts tipping, the bigger the difference the faster it tips. If one end touches bottom the level has failed. A score may be given to the player based on the number of moves it takes to collect the required amount of the two different types of game element.

In an alternative embodiment the balance mode also allows for the player to reach a bonus mode through collecting the game elements that are included in the criteria for the balance. The advanced balance mode mechanic may be placed on top of the existing game modes giving depth to the game play. The point of the mechanic is to balance two types of game elements. Which types of game elements the player is required to collect may be defined by the types of game elements available on the game board. After a certain number of collected game elements (specified in the level data) the player will be rewarded with a bonus mode.

Figure 5A:
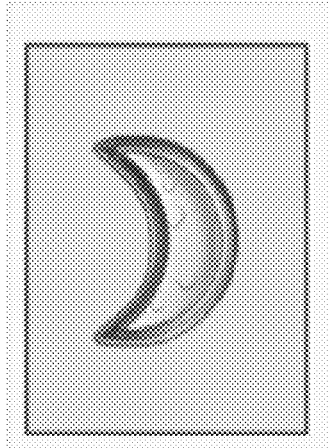
FIGS. 5a to 5d shows a game object at different points of a game, the game objects providing an indication of progress towards a game objective.
Figure 5B:
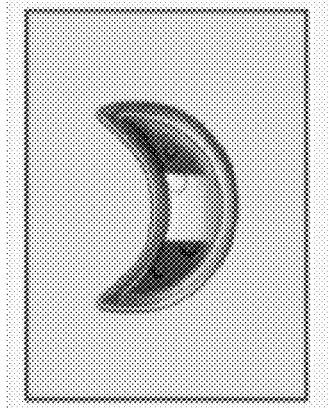
Figure 5C:
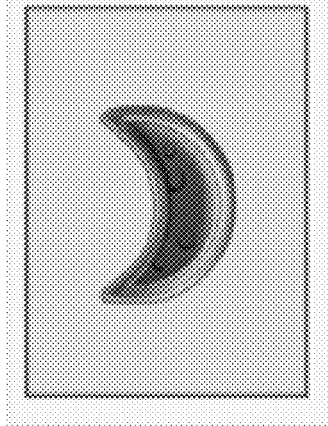
Figure 5D:
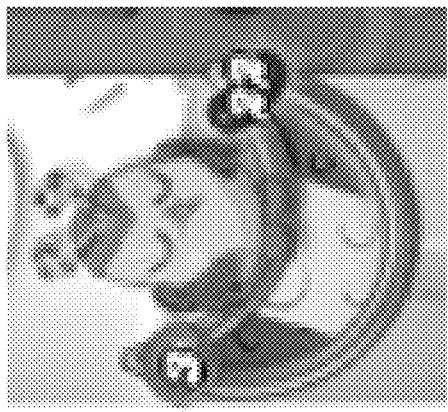

The scale is filled up to reach a predefined number of collected game elements of the two defined game elements on the scales. In FIG. 5, the indictor or scale is in the form of a moon but the indicator can take any suitable form. In FIG. 5a, the beginning of the game level is shown and the indicator is empty. As the moves are made, the indicator fills up from the centre to the sides as shown in FIG. 5b. In FIG. 5c, the indicator is full indicating that the level has been achieved. FIG. 5d shows an indicator for balance mode which shows the balance of the two different game elements to be collected. In this example, there 3 of one type of game element and 22 of the other type of game element. In this embodiment, the indicator visually indicates by tilting of the indicator this imbalance of the different game elements to be collected.

The win condition may be the same as the level's game mode.

For the lose condition, the number of game elements of the chosen characteristics such are as colours that the player switches is counted and the difference is calculated. When the difference of the colours being balanced becomes bigger than X (where X is specified in the level data) the level is lost.

In some games, there may be a bonus mode (Moonstruck). For each successful move a number is increased. When the number reaches Y (where Y is specified in the level data) the bonus mode will be triggered. When triggered the bonus mode will remove one or more game elements have a particular characteristic such as colour from the board (based on the final switch that put the board in the bonus mode). For the next Z moves (where Z is specified in the level data) the player will be in the bonus state. During this time the removed game element will not spawn and there is no need to balance any colours. After Z moves the player will go back to balancing with one or more new randomly chosen characteristics. E.g. If there is a level with 20 moves, the bonus mode may be triggered after 15 moves and the last five moves in bonus mode.

The bonus mode may not affect the balance, that is some game elements removed by the bonus mode will not be accounted for in some embodiments.

The bonus mode may also be triggered after collecting a number of the balanced game elements. This can be done to force the player to switch balanced candies.

Games of some embodiments described herein can be connected to or linked with a social network such as Facebook™ or Google+™ or a games platform with different players who can interact and see each other's progress. It is common that the users on such networks have avatars with for instance a photo of the user and/or the user's name. Such avatars can for example or alternatively be a sign or a figure.

The social network can be located on a server that is different from the server on which the game is located, the game and the social network can alternatively be located on the same server. In some embodiments there is a direct live connection between the social network and the game platform that continuously synchronise them, in other embodiments the two platforms synchronise at certain intervals, such as when the player logs into the game. The player's progress when having played in offline mode (for instance completed levels and score), for example if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some embodiments the avatars can be derived from a social network to which the game is connected, in other embodiments they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API, which allows websites and applications to draw and share information about more objects than simply people, including photos, events, and pages, and their relationships between each other. This expands the social graph concept to more than just relationships between individuals and instead applies it to virtual non-human objects between individuals, as well.

A game can typically share in-game events such as that a level has been completed, that a player has passed a friend in the game or beaten a friend's high score on a level. The game can also post events, such as that a player has purchased objects in the game or received objects from other players of the game.

One way of implementing a game using the techniques described herein is through a web site with a plurality of casual games. In some web-based embodiments the game is implemented to be played in head-to-head tournaments, have a limited number of levels and no external social network connection. In some embodiments the players can play the game against other players on the platform.

Some embodiments may be based on a virtual terrain in which the player progresses. This embodiment may have a connection to an external social network, and may have multiple game modes such as asynchronous and synchronous tournaments and single player mode. The nodes on the map in the game are typically different levels that the player can play.

Figure 11:
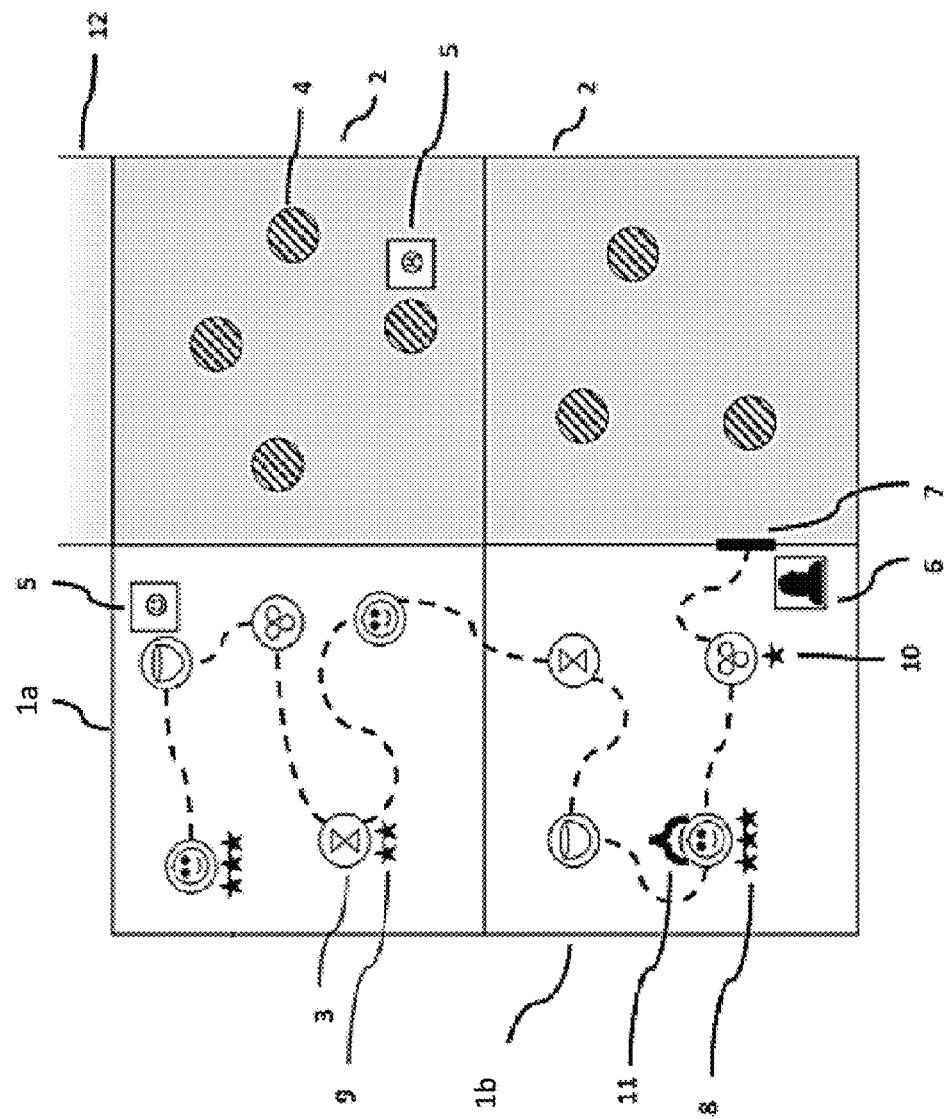
FIG. 11 schematically shows a representation of progress in a game.

The game can be implemented so that a player progresses through multiple levels of changing and typically increasing difficulty. FIG. 11 shows an embodiment of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players. In the example shown in FIG. 11, there are two different progress paths.

The virtual map consists of stages 1a, 1b, 2a, and 2b with varying number of levels 3, 4 represented by nodes on the virtual map. Stages 1a and 1b represent one progress path and stages 2a and 2b represent different progress paths. The user moves between levels and completes the levels one by one along a path by playing the associated game. When the player reaches the goal of a level, the next level on the path is unlocked and the player can play that level in the game. The number of stages and levels can vary depending on the embodiment.

In some embodiments of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map can be added by the game designers at any time—so a game may be launched with say 20 levels, and after a number of weeks, there may be fifty or sixty levels present.

Stages in the game can be locked or unlocked. In most embodiments, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some embodiments, certain levels and stages are locked based on other criteria than the player's linear progression in the game. Such levels can for instance be based on the total score the player has achieved on all levels, the average performance on levels or on the number of friends that the player has invited to play the game.

In one embodiment, one challenge to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different embodiments, for instance it can be hard or soft currency, or it can be based on score achieved in the game. It is possible for the currency to be associated with a social network to which the game is connected, or it can be associated with another platform related to the game. The player can use a combination of help from friends and payment to unlock the new stage. The cost for unlocking can in some embodiments be lowered as a fraction of the total number of friends needed when help from some but not all needed friends have been received.

There can be ways of getting past a collaboration block other than asking friends for help and paying for it, which are the most common ways of passing a collaboration block. This can be done through the use of 'Mystery Quests', which gives the player the option of completing one or several challenges to unlock the block. Such challenges can for instance be to play one or several past levels with modified goals in order to pass the collaboration block, for instance three levels—one for each of the locks.

These challenges are typically in the form of replaying a previously completed level but with a new goal to reach, for instance a target high score. In a typical embodiment, the score requirement is higher than it is for playing the level regularly, and also no other goals need to be fulfilled. For example, if the player gets to replay a level with a goal (different from a target) with a new target high score, the player would not need to achieve that other goal as long as the target score was reached.

The request for help is sent to the friend who then has the option to accept to help. The request for help can in some embodiments be sent using the social network to which the game is connected; an alternative embodiment is to send the request to someone external to the game (via email, text message, instant message for instance) who has to join the game to respond to the help request. It can be understood that there can be variations between embodiments as to how players respond to requests from other players. In a typical embodiment, a link will be provided to the player who has been requested to help. This link can be related to a social network to which the game is connected. This is one of the viralisation techniques implemented in some embodiments.

In addition to the virtual map layout FIG. 11, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 11 may be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different embodiments of showing where the user currently is on the map. This can for instance be the latest level the user completed, the level where the player has achieved the highest score or the last completed level along the traversed path.

The user can in some embodiments be given the option to select which users should be shown on the virtual map. The users can to choose from friends on a social network, or the user can get suggestions to show friends which meet a certain criteria, for instance friends which the player has interacted with the most in the past or friends living in the same geographic area as the player. An avatar 5 or other information can be displayed on the map to represent the progress of the user The user can get the option to choose from other people who are not friends on the social network, but that meet other certain criteria.

The user can play any of the unlocked levels on the map, so the user can go back and replay already completed levels to get a better score or beat friends' high scores.

In some embodiments of the game the player is rewarded for good gameplay of a level, for instance reaching a target score or completing the level in a short time. In some embodiments the user has to reach a certain number of points to complete a level, reaching this target score can be represented with a symbol such as a star. In one embodiment a star is lit when the user reaches a certain number of points in a level. The user can earn more than one star on each level and the levels are re-playable to get a higher score. In some embodiments the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockable features might be given to the player while others require a purchase to be accessed.

The symbol representing how well the user has played on each level can be displayed alongside the level on the map 8, 9, 10.

In the map view, the player can hover over an unlocked level to display a thumbnail version of it. This makes it easier to find specific completed levels, and can also give the player an idea of what to expect before actually starting a level. In a typical embodiment, thumbnails cannot be displayed for levels that have not yet been unlocked. If trying to view one of these a symbol of a padlock will be in the place where the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leader board showing who among the user's connections, or among a subset of the user's connections, has the highest score. There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance be in the form of an object related to the game goal, such as an hourglass representing a level with a time constraint.

The landscape of the virtual map will typically have animated sequences, which give a feeling of the map being alive and dynamic. For example, trees on the map can sway in the wind, animals can move around and the player progressing from one level to another can be accompanied by an animation of a player-associated character moving on the map.

In some embodiments, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Before starting a level, players have to select which level to play from the map view. When selecting a level, the player is shown information about the level, such as the amount of points needed, the available boosters that can be used, the goal of the level and also the high scores of friends who have previously played that level.

Figure 12:
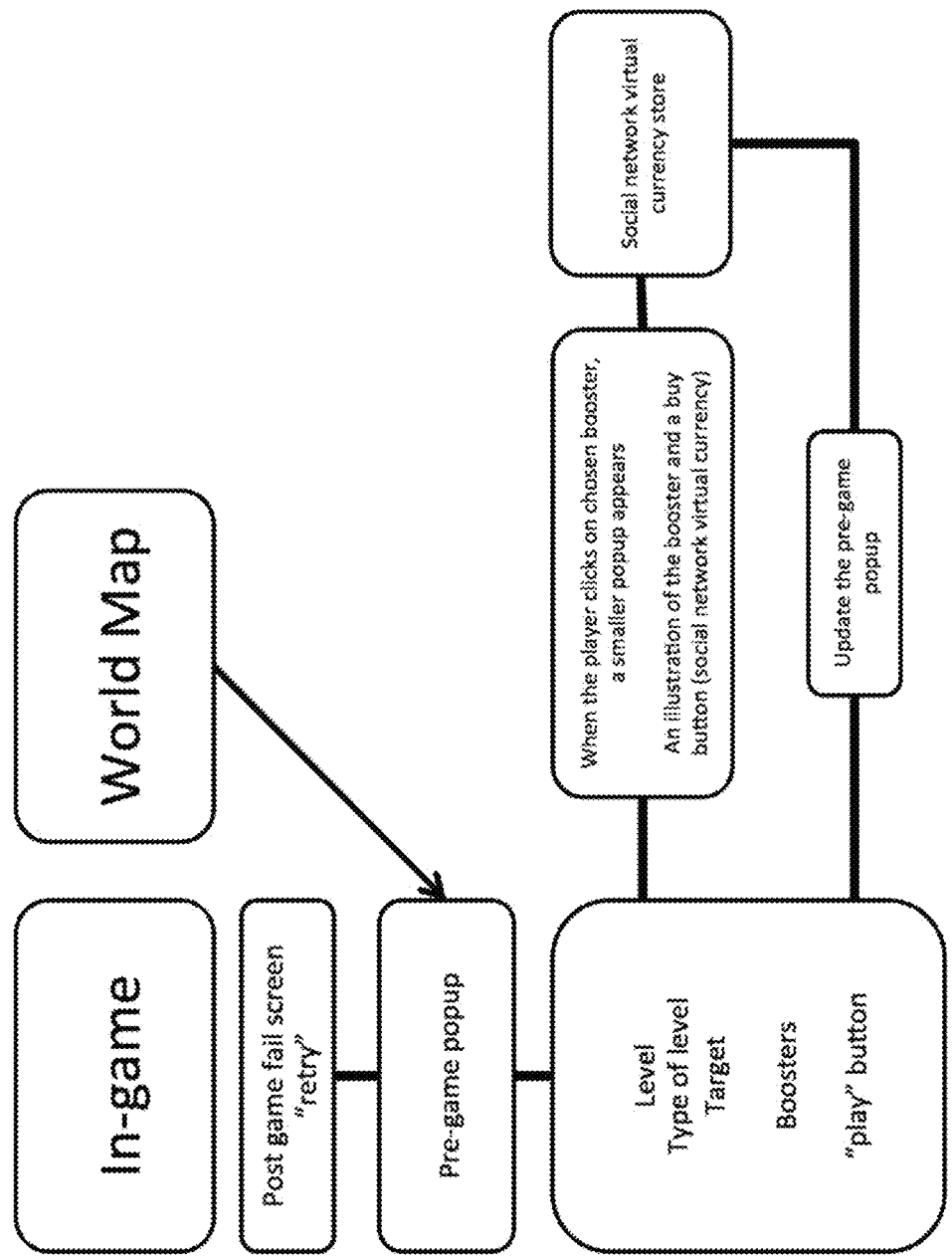
FIG. 12 schematically shows a mechanism for pre-level game progress.

FIG. 12 shows one embodiment of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 13:
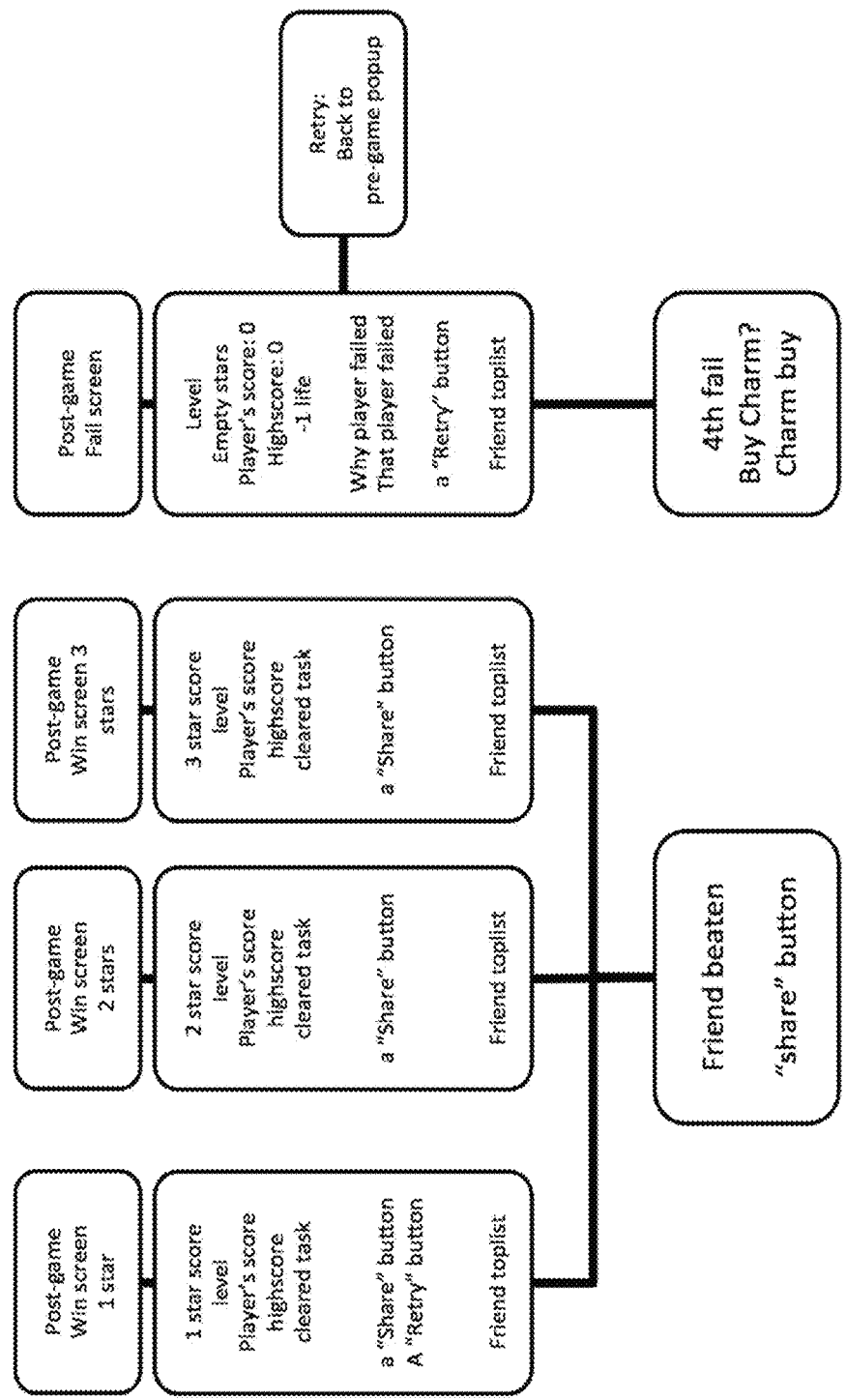
FIG. 13 schematically shows a mechanism for post-level game progress.

After completing a level, the player is presented with a screen that shows the amount of points gained, the amount of stars achieved and also the previous high scores of friends. One embodiment of the game flow related to the post-level screen is shown in FIG. 13.

Both of the post-level screens discussed may present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' high scores, together with a message about which friend(s) have been beaten.

When showing the pre-level screen, players are presented with the high scores of friends. This gives an opportunity to know beforehand what to aim for, and is something that increases the competitive element in the game. The information about friends' scores can be derived from a social network to which the game is connected, it can also be retrieved from a database related to the game. It may be used for further increasing the engagement of players and to some extent viralisation, since players are constantly being reminded about the performance of others, which can incentivise players to try harder and subsequently play more.

In some embodiments, each area in the game or certain groups of friends or players can have a 'Champion', 'King' or similar, meaning the player within a network of players that has the best performance on the levels in that area.

Some embodiments may be implemented in a game environment where the player can progress in the game on a parallel or alternative path with levels that may or may not share elements with the first level progression path.

The corresponding levels may be similar only changing for example one of the game goals on that level.

Some embodiments may be such that the levels on the parallel level progression path share layout and level goals with the first level progression path and that all the levels may have an added additional challenge element or game mode. One such added challenge element may be the advanced balance mode described previously where the number of certain game elements may be weighed against each other on a balance scales for the player to outweigh one game element or to keep the scales straight depending on the embodiment.

Providing a game with the described dual level progression path may allow the available levels to be increased without having to create whole new levels. A game designer may need to adjust some aspects of a level to achieve the desired playability in the level with the added game goal. This may reduce the time required to design the parallel levels. In some embodiments, the code for one level in one progression path may be used in the corresponding level in the other progression path. The code may be modified to include an additional goal. In some embodiments the code is separately provided for each corresponding level. In other embodiments, common code is stored in memory and is used by both of the corresponding levels.

Figure 8A:
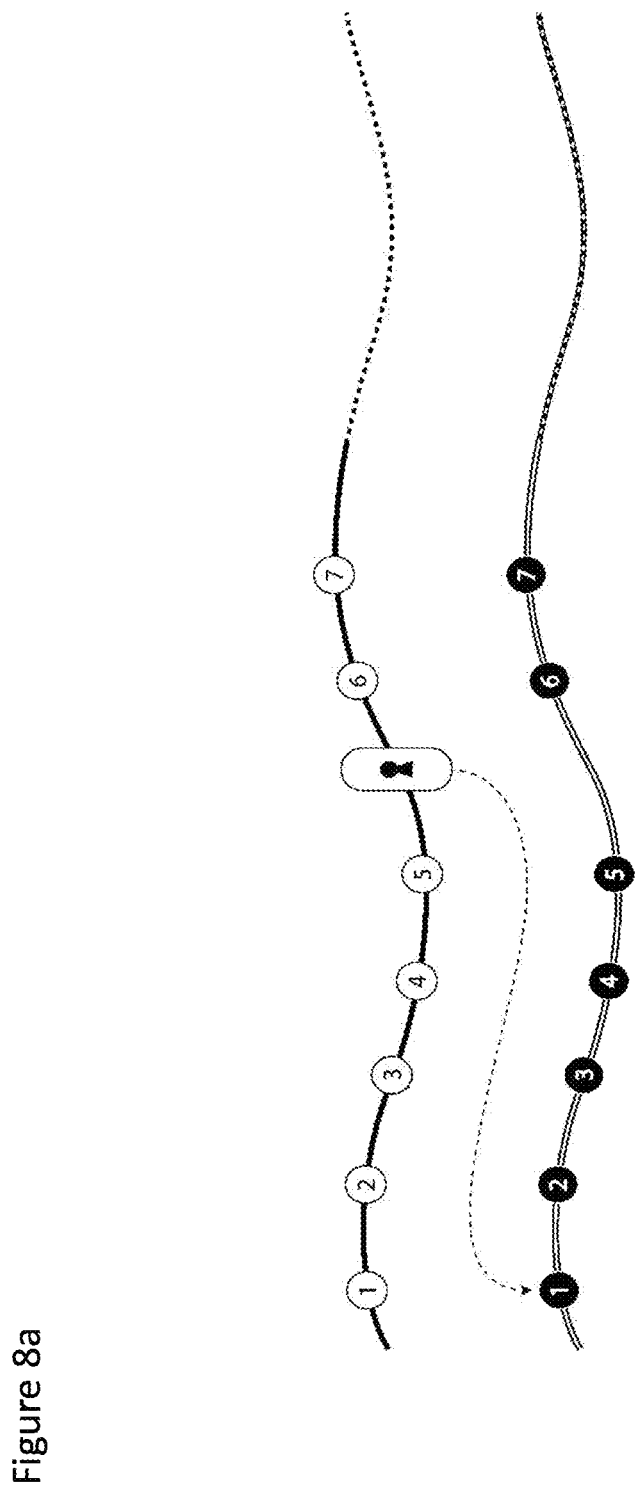
FIGS. 8a to d schematically show examples of dual progress path structures for a game.

The player may unlock the dual progression path when he has reached a certain stage in the main level progression path. This does not have to be the last level but can be a level somewhere along the level progression path. This is shown in FIG. 8a. In the embodiment of FIG. 8a, the player has to complete x levels (5 in the example shown) before the player is able to play on the alternative progress path.

The criteria to unlock the dual progression path may alternatively or additionally be a criteria that is related to several different levels such as that the player has completed a number of levels with a high score or collected 'stars' at prior levels.

Figure 8B:
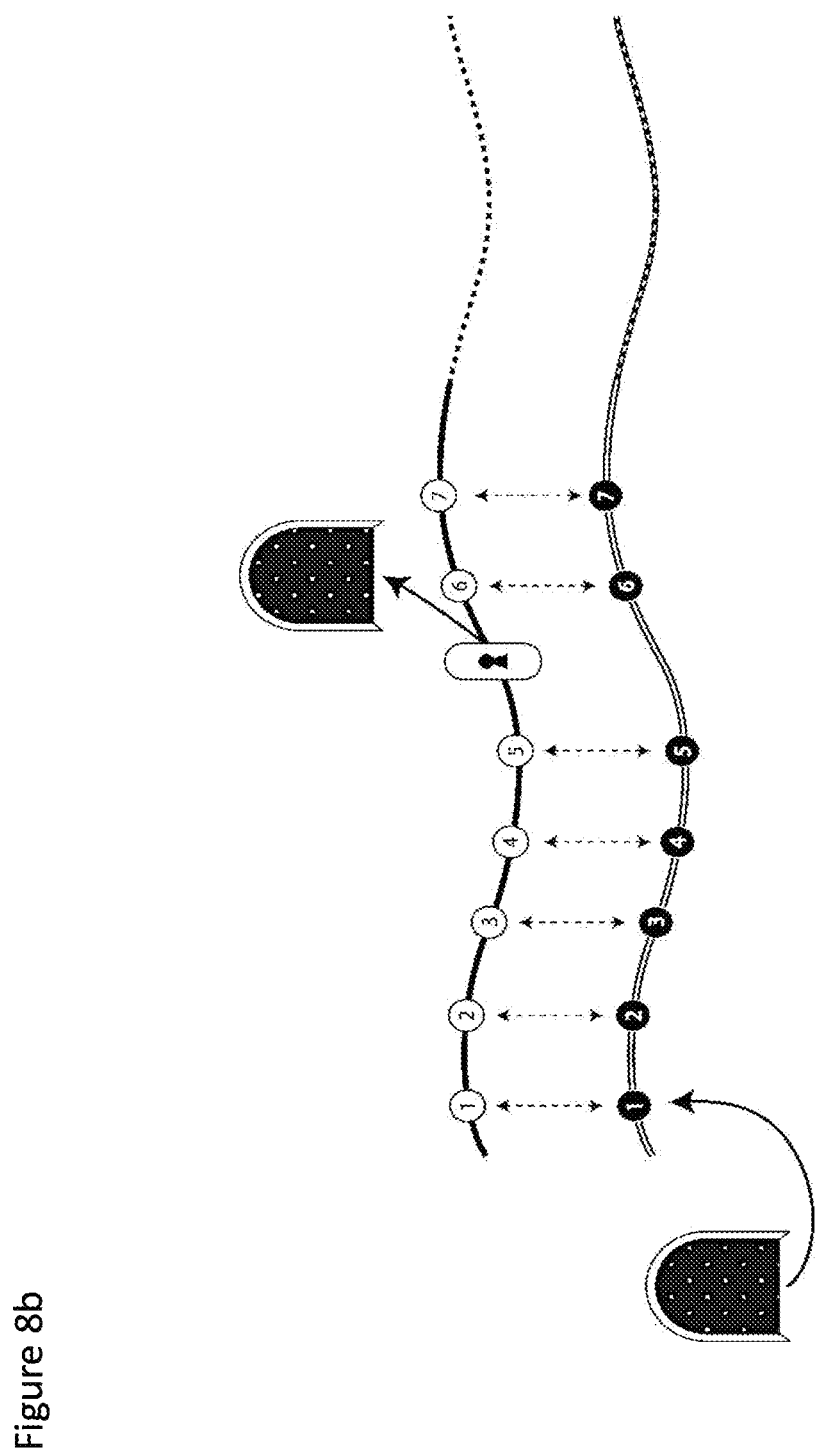

In the example of FIG. 8b, the progression in the parallel paths are tied to each other. Once the parallel path is unlocked the further progress along each path may be dependent of the progress on the other path. This may be so that to progress from level z on one path the player has to complete the level goal on level z on the other path.

In an alternative embodiment completing the level goal on a level will also unlock the same level on the parallel path.

Figure 8C:
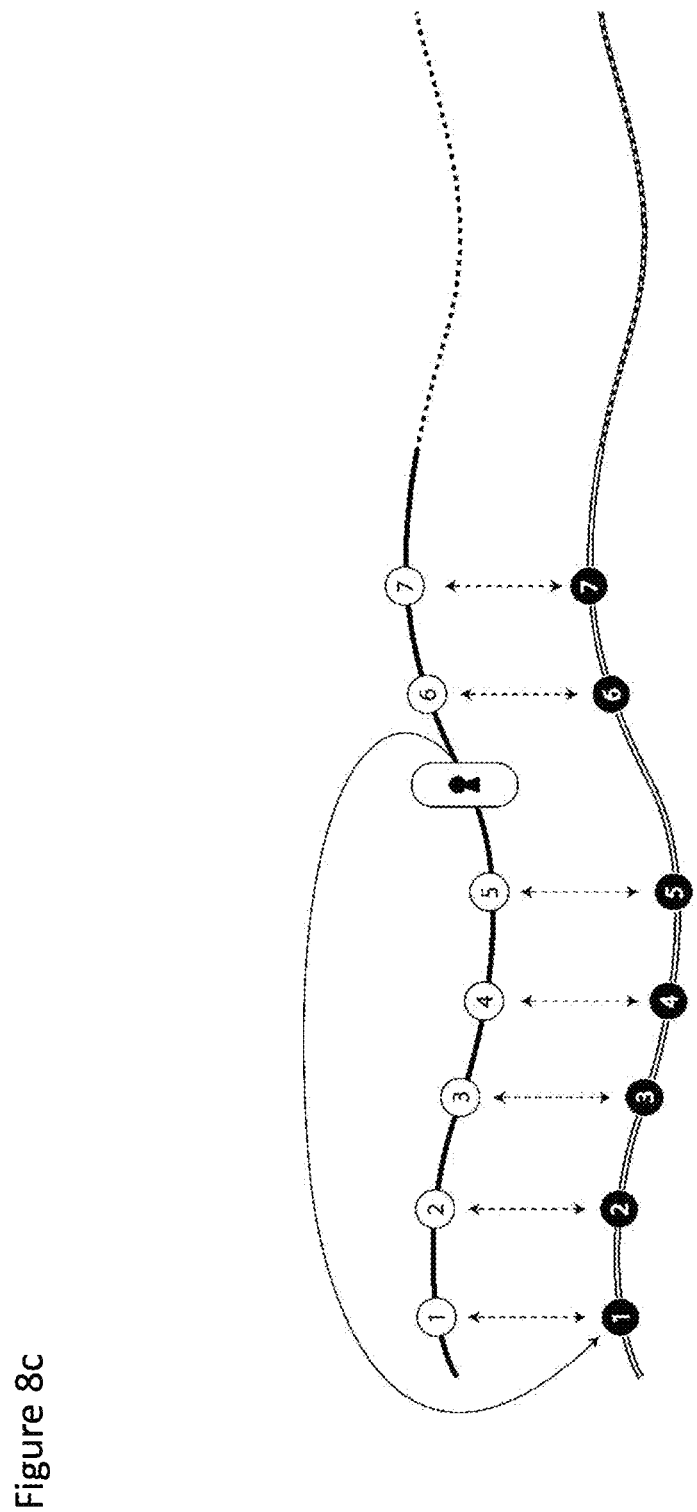

In another embodiment the player may unlock the different levels within an area on the map on each path without unlocking the corresponding level on the other path. The player may however not move to the next area on the parallel path if the new area has not been unlocked on the first path. This is illustrated in FIG. 8c.

The player may need to unlock corresponding levels in both progression paths before being able to progress to the next level in either of the progression paths.

Figure 8D:
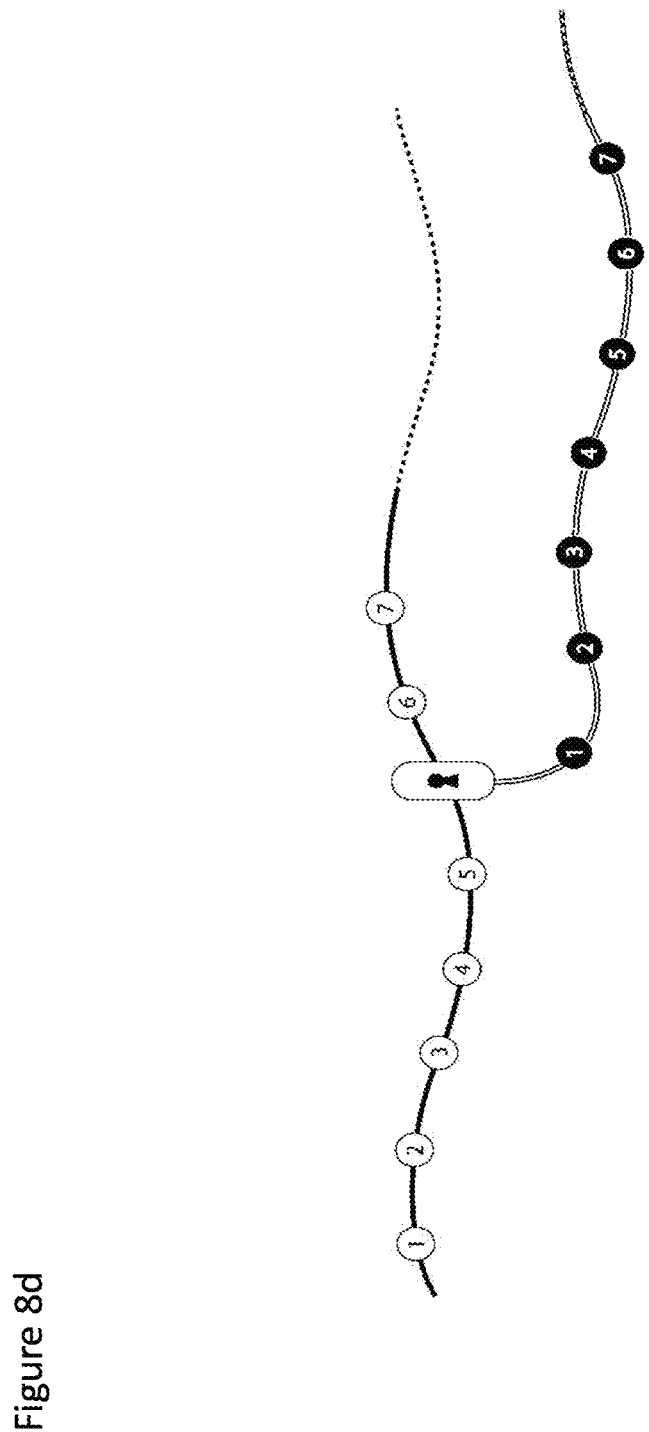

In FIG. 8d, there is initially one progress path and then this forks into two. One fork may be regarded as the beginning of another progress path and the other fork may be regarded as a continuation of the initial progress path.

Other embodiments are possible where the paths have one or more parts which are shared and one or more which are in parallel. In some embodiments, the parts of the path which are in parallel will have corresponding levels and in other embodiments the levels may be shifted. For example, one parallel portion may have levels 1, 2 and 3 whilst the other parallel portion may have levels 4, 5 and 6.

In some embodiments, level x on one progression path will share at least some characteristics with level x on the other progress path. In other embodiments, the levels on the different paths may differ. In some embodiments, the level characteristics from one progress path may be reused, at least in path, in levels on the alternative progress path but the ordering of the levels may be changed. For example level 10 in one path may be substantially reused in level 20 of the other path.

Figure 7:
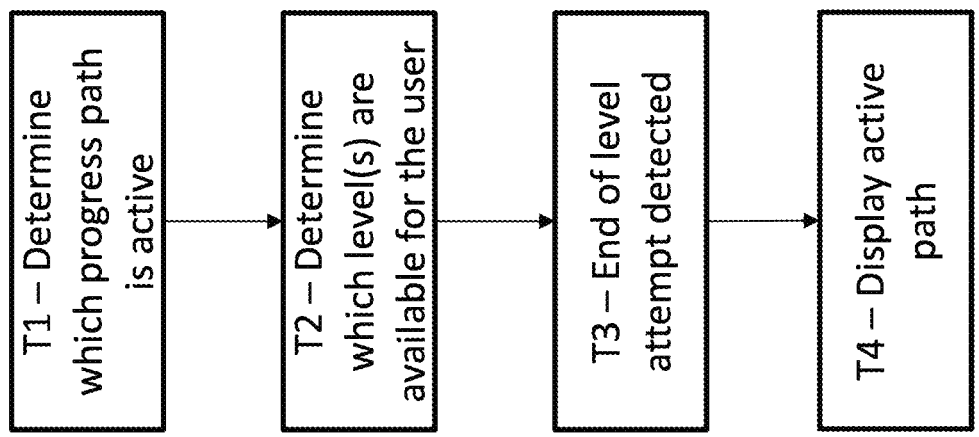
FIG. 7 shows a flow chart for the determination of an active progress path.

Reference is made to FIG. 7 which shows a method of an embodiment. In step T1, a determination is made by the processor as to which map or progress has been selected or is active. For example, the processor may be responsive to user input selecting one of the available progress paths. Some games may be provided with an icon or similar on the display which when selected via the user input cause the associated progress path to be displayed. The determination may alternatively or additionally take into account the level which the user has just completed or failed. The processor may select the progress path associated with the current level or may, in dependence on the current level select the alternative path. In some embodiments, where both of the progress paths, the selected path may be displayed in a different way to the non selected path.

In step T2, a determination is made as to which levels are available for the user. This may depend on which stage the user has completed and the last level completed by the user. The image is caused to be displayed may display levels which are available and the levels which are currently unavailable for play differently.

In step T3, an end of a level attempt is determined. This will be either the completion or failure of a level.

In step T4, a determination is made as to whether the end of level attempt is to one or more of change the progress path, to change which progress path is available and change the level available in one, other or both of the progression paths. In dependence on the determination, the active path will be displayed.

In some embodiments the level progression path is shown as a map where the player traverses from node to node. In the example of FIG. 11, the two progress paths are displayed side by side. In other embodiments, responsive to user input one or other of the parallel paths may be displayed.

Figure 9:
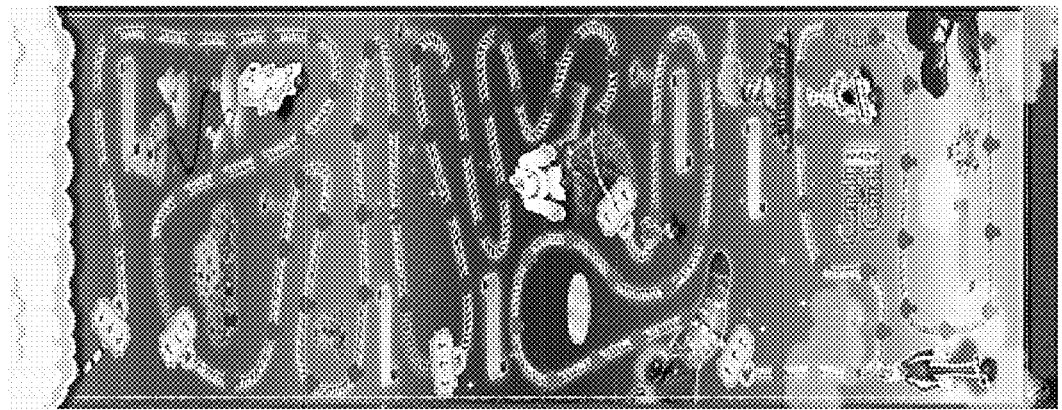
FIG. 9 shows an example where one progress path is inverted to provide a second progress path.
Figure 9:
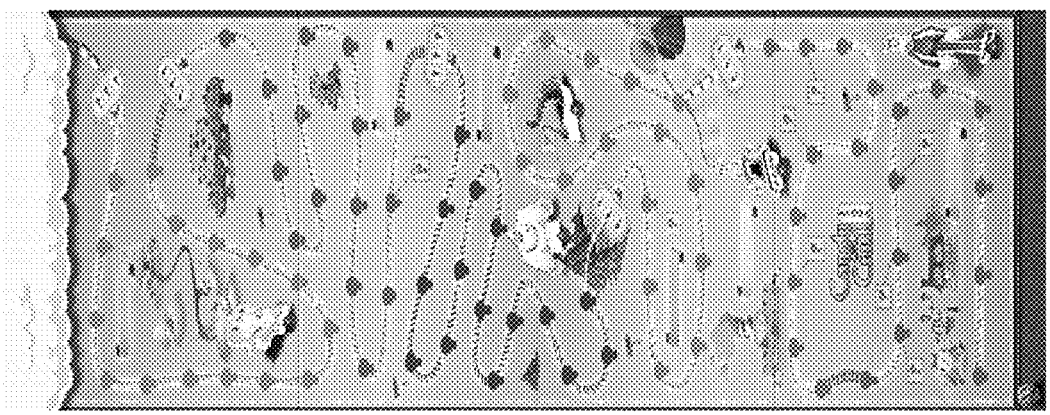

The parallel path may be shown as a similar map path where some of the features have been changed. One such embodiment is shown in FIG. 9 where the parallel path is implemented as an inverted map. Visually this parallel path may be provided with different colouring to distinguish from the regular map. The player can in some embodiments navigate between the maps through the user clicking or selecting on a feature such as a button or icon on the map interface.

The game may be implemented with a straight progression where the player unlocks the levels in number order. The game may also be implemented using an alternative unlocking method where each level forms part of a non-linear progression consisting of dynamic locks for each level. The method may however be implemented so that there is a straight progression in so that one level has the unlock criteria that the previous level has been unlocked.

There can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The player's total number of stars collected in the game can in some embodiments unlock features. The unlocked features can for instance be power-ups, in-game currency or bonus levels.

The client library can be implemented so that there is a non-linear progress path. This means that the user does not have to complete all the levels in the order of 1, 2, and 3 and so on. Instead levels are unlocked by meeting certain criteria.

Figure 10:
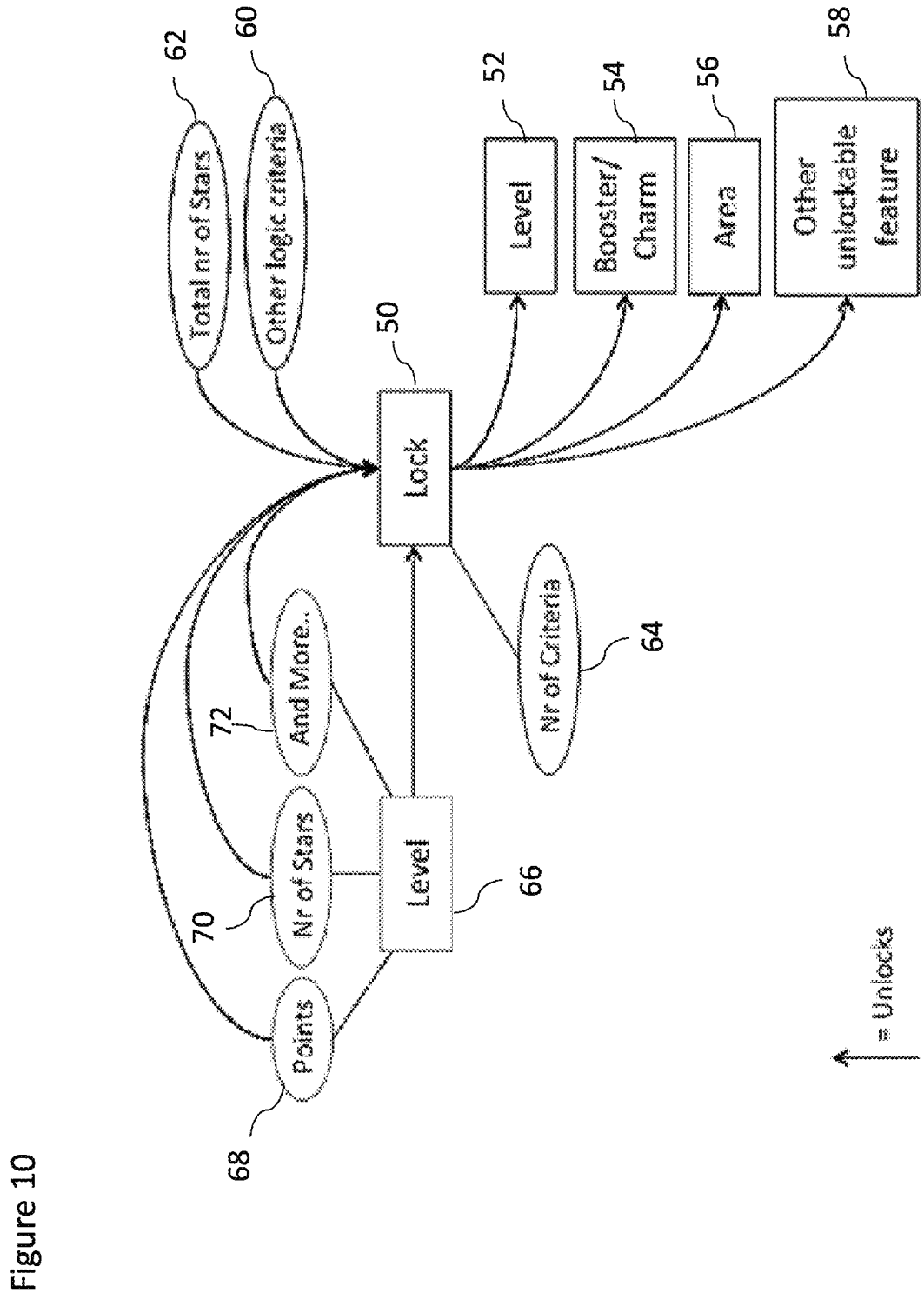
FIG. 10 schematically shows a mechanism for controlling progression from a level.

The criteria are referred to as locks. Reference is made to FIG. 10 which shows how a lock can be unlocked and in turn what it unlocks. Locks and levels are both objects and anything else that is logic can be called an object. The locks may be dynamic and they can be used with any kind of object, for example, a criteria of a lock could be to unlock another lock, to achieve a level or triggered by an external condition unrelated to the game such as date, time, outdoor temperature is below a certain temperature etc.

Levels can display locks that need to be fulfilled in other to play that particular level. A level also shows what locks it itself is connected to.

In the example of FIG. 10, the lock 50 will unlock responsive to the one or more the associated criteria 60 being satisfied. The one or more associated criteria may comprise one or more of: one or more levels being completed; the player having achieved a given number of points 68 in the level; a given number of stars 70 in the level; any other criteria in the level 72; a total number of stars 62; or any other cumulative criteria.

In the example of FIG. 10, the lock 50, when unlocked unlocks one or more of: a new level 52, a booster/charm 54, a new map area 56; and any other unlockable feature 58.

Figure 6:
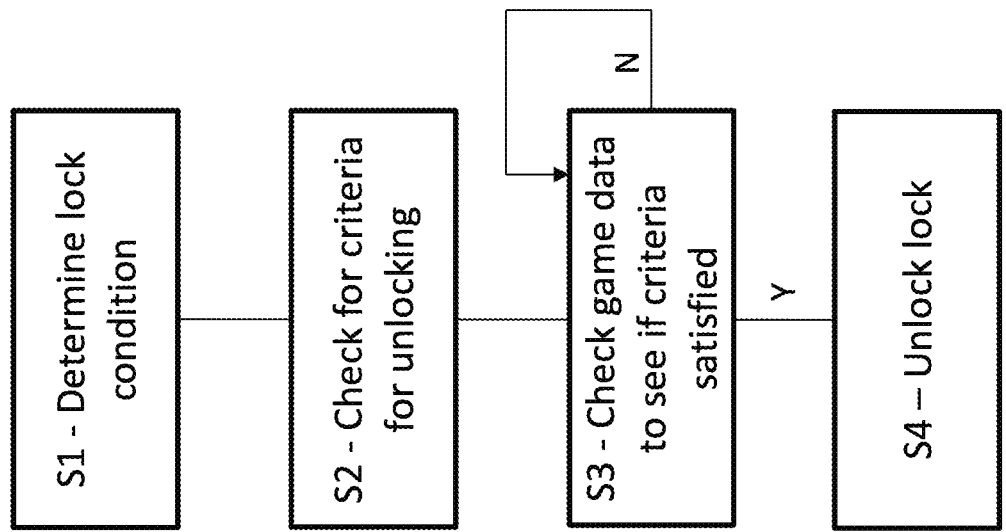
FIG. 6 shows a flow chart for the unlocking of a lock condition.

Reference is made to FIG. 6 which shows a method flow in some embodiments which may be performed by the processor.

In step S1, the processor makes a determination that a lock condition exists. This takes into account information as to where the player is in a game. This will be responsive to interaction of the user with the game and stored information.

In step S2, the processor will check the criteria for unlocking the lock. Steps S1 and S2 may be carried out together. The processor will use stored information.

In step S3, the processor will check the stored game data to see if the criteria is satisfied. The game data is updated in response to user interaction with the game. If the criteria is not satisfied, the processor will repeat step S3 to check if the criteria is satisfied.

If the criteria is satisfied, in step S4, the processor will unlock the lock. In practice, this means that the game is updated to allow the user to access the next level, booster etc. The display will be updated to indicate that the lock has been unlocked. This may comprise displaying a message to the user and/or updating the displayed image to allow access to the unlocked feature(s).

The progress can be linear.

Some embodiments provide logical game progression through a system of different sets of objects. These objects can form relations with other objects by referring to these objects in the form "object_type:numerical_id", which functions as a unique key for performing lookup of a particular object. Game progression may be specifically implemented in the form of different types of lock objects referring to other objects for input, and unlocking a set of target objects once the input objects provide data that satisfies the given lock's prerequisites. The unlocked objects are upon unlocking marked as such and are thereafter ready to be accessed in the game.

In some embodiments the lock mechanism will work as follows. Every time a certain event occurs, a check is made to see if the event is related to one or more locks. If the event relates to a particular lock, then a check is made to see if the occurrence of the event is enough to cause the lock to be unlocked.

The lock mechanism works may alternatively work as follows in some embodiments:

1. A level has been updated with the star level manager update level function—IStarLevelManager.updateLevelById( . . . ) function 2. The star level manager throws an object identity event with an object identity that refers to the level: ObjectId ("startlevel",id)

3. The lock manager receives the event and calculates a list of locks that depends on the ObjectId ie. the level.

4. Each lock in the list is evaluated. If the lock state changes a lock event—state changed event is thrown for each of the locks targets.

5. The lock manager (processor) also listens to lock events, so it will receive the event. Then it tests if the object identity refers to another lock. If it does the lock will be evaluated as in step 4. If it does not, it does nothing.

6. Assuming that one of the targets for the lock was a star level. The star level manager, which also listens to the lock event—state changed, receives the event. The star level manager sees that the event is referring to a star level and proceeds to change the state of the level to unlocked and updates the level. Go to step 1

A brief description of a Omniverse file format follows.

```
{
    "lock": {
        "1": ["starlock", {"stars":1}, [{"starlevel": 1}], [{"starlevel": 2}]],
        "2": ["starlock", {"stars":1}, [{"starlevel": 2}], [{"starlevel": 3}]],
        "3": ["starlock", {"stars":1}, [{"starlevel": 3}], [ ]],
        "4": ["starlock", {"stars":1}, [{"starlevel": 4}], [{"starlevel": 5}]],
    "5": ["starlock", {"stars":1}, [{"starlevel": 5}], [{"starlevel": 6}]],
    "6": ["collaborationlock", { }, [{"collaboration": 1}], [ ]],
    "7": ["andlock", { }, [{"lock": 3}, {"lock": 6}], [{"starlevel": 4}]],
        "9999": ["starlock", {"stars":1}, [ ], [{"starlevel": 1}]]
    },
    "collaboration": {
        "1": 3
    },
    "events": {
        "1": "showTutorial1"
    },
    "episode": {
        "1": [{"starlevel": 1},{"starlevel": 2},{"starlevel": 3},{"starlevel": 4}]
    }
}
{
    "starlevel": {
        "1": [1000, 2000, 3000],
        "2": [1000, 2000, 3000],
        "3": [1000, 2000, 3000],
        "4": [1000, 2000, 3000],
        "5": [1000, 2000, 3000],
    "6": [1000, 2000, 3000]
    }
}
```

Each file is a JSON object containing one or more JSON objects as properties.

These properties describe sets of different omniverse objects—each set is handled by a corresponding section parser in the Omniverse ant task.

Omniverse objects can refer to other omniverse objects by identity. A complete reference includes object type as well as its declared id. A reference to the starlevel object with id "3" looks like this, for example:

{"starlevel": "3"}

In other words, object references in some embodiments may be JSON (Java script object notation) with a single property, the property name being the referred object type and its value the identity.

Objects are defined by a description contained in a single JSON object, which can be an array. What follows is a brief summary of how some of the available object types are described:

"starlevel"→[star score 1, star score 2, star score 3]
Three score target for the different stars.

"lock"→[lock type, lock argument(s), input objects, target objects]

A more sophisticated type of object. The first argument gives the name of which lock generator to use in the build task. The lock generators can be generated with custom locks. The second argument is a single object which is passed as a parameter when the lock is instantiated. Star level locks take an argument for how many stars are required to unlock for example. The third and fourth arguments are arrays of references to objects on which the lock operates. The input objects are used to determine whether the lock should be unlocked or not, and generally need to be of a specific type depending on the lock type. Star level locks require all inputs to be references to star levels for example.

The target list on the other hand can contain references to any kind of objects. These specific objects will become unlocked once the unlock condition in the lock is fulfilled for all input objects.

An empty input list means the lock always evaluates to true when tested for unlocking; an empty target list means that no specific objects will become unlocked for this lock (but it can still be used as an input for another lock for example).

"collaboration"→slots

This defines a collaboration container with a specific identity and a number of slots. Once all slots are filled by your friends, the container will evaluate to true for unlocking purposes.

The criteria for a lock can be randomized. In some embodiments, the criteria is defined when compiling the game client.

In some embodiments, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some embodiments, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 14:
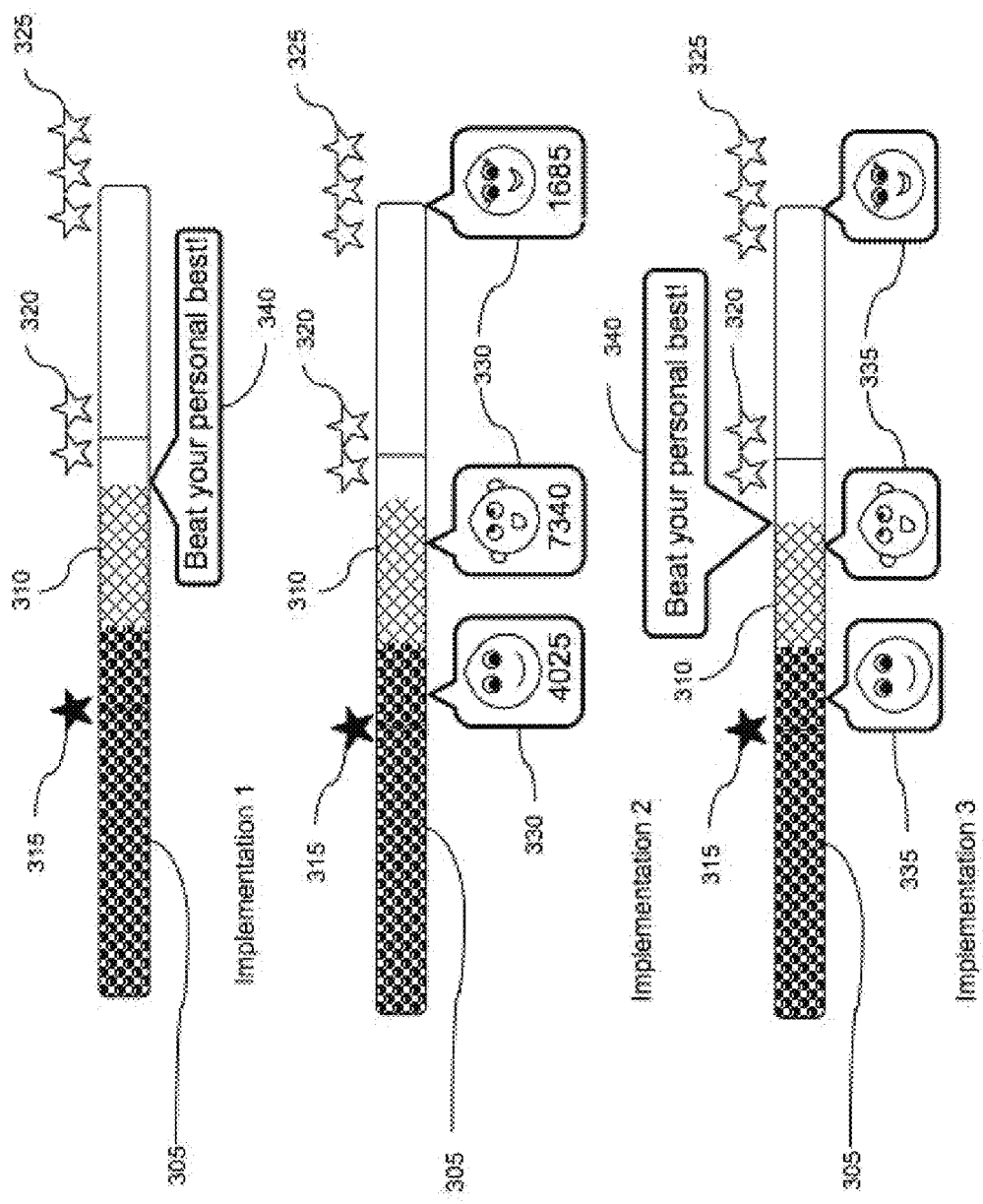
FIG. 14 schematically shows three examples of score display.

In some embodiments, the player can see indications of his current amount points, as shown by 305 in FIG. 14, but also with indications of the previous high score achieved on a level while playing it, shown by 310. Another embodiment could be that there is a message pointing and indicating to the player to beat their personal best 340. It is also possible that no indication of the player's own previous score is shown.

In some embodiments there is an indicator showing how well the player is doing. After having reached a certain amount of points a star could for example be shown, as by 315, and if earning even more points two or three stars could be shown, as by 320 and 325. The indicators do not have to be stars but could be implemented in many other ways. This is the first example.

In some embodiments, the indications of the performance of other players are shown in relation to the score meter. It can be both absolute and relative indications. The indications can be in the form of pictures associated with the players, as shown by 330 and 335 in FIG. 14. This is the second example. When the player passes the score of another player or the previous best score the player has achieved, a message can be shown to encourage the player and denote the accomplishment. This is the third example.

It should be understood that embodiments are not limited to using stored scores to show the performance of other players. In one embodiment, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at. This is represented by the avatar or other suitable image 5 on the virtual map of FIG. 11.

It is also possible to invite new players to play the game. These can be invited through the game platform or through a social network to which the game is connected. In some embodiments, the game suggests which players to invite. This suggestion can for instance be based on whether the players have played other games from the same developer, if they are active on a social network or if they seem to like other games in the same genre. It is also possible for the suggestions to be based from data related to a social network, such as how often they interact with other players or how often they log in to the social network.

One aspect that may increases the competitive element of the game is that messages can be sent to friends, for instance related to beating their scores or passing them in terms of overall level progression. In some embodiments, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

In a typical embodiment, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some embodiments, the player will regenerate lives over time, for instance by replenishing one life every 30 minutes. In other embodiments, the player can only regenerate lives by performing certain actions, such as playing other games from the same developer or by making a purchase related to the game.

One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 15:
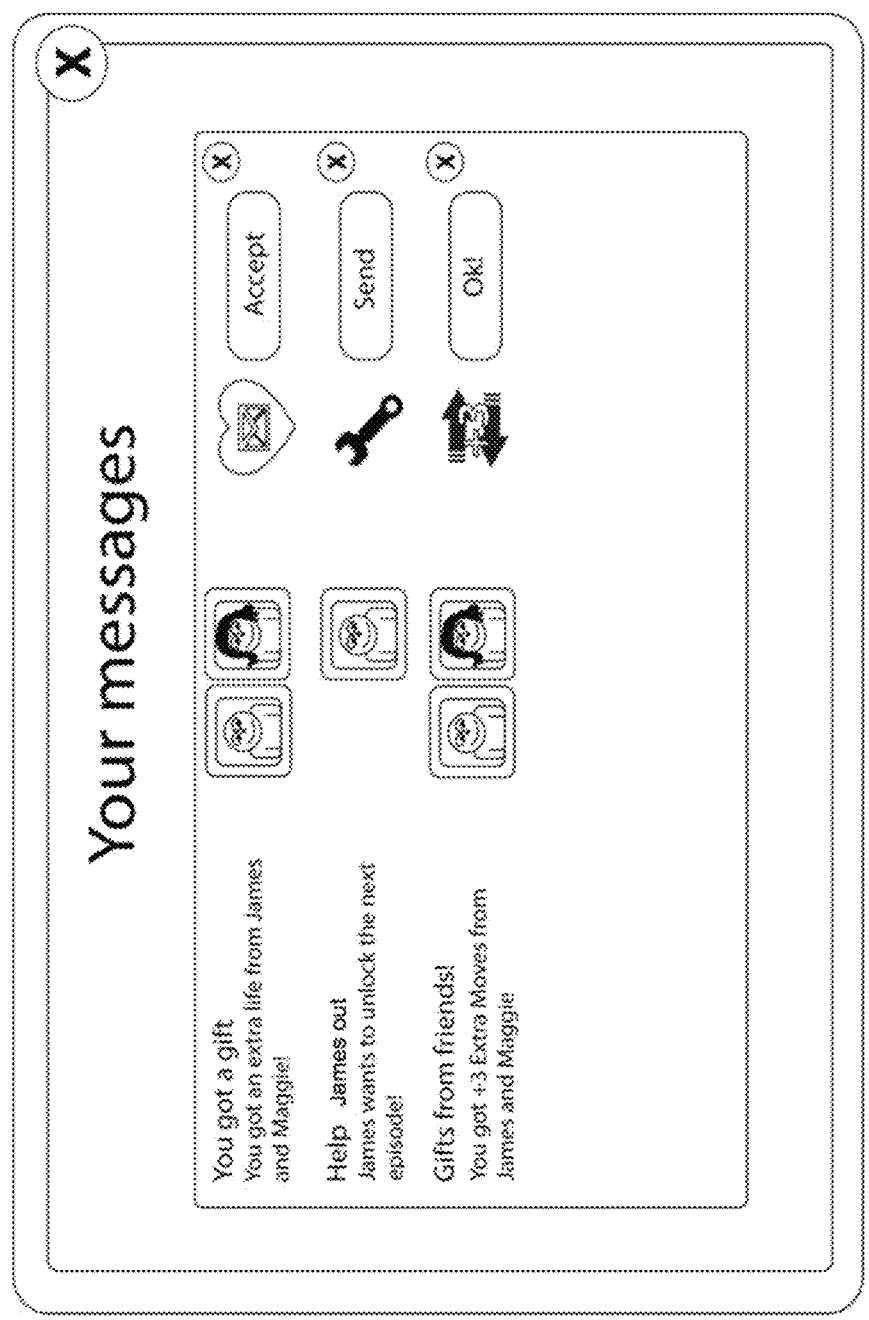
FIG. 15 schematically illustrates a lives giving and/or receiving display.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some embodiments, the player can send a life back by just clicking a single button. The life can for instance be sent via the game platform or via a social network to which the game is connected. FIG. 15 shows one example of an embodiment in which the player is prompted by the game to send lives or other help to friends.

In some embodiments the game prompts players to send lives to other players that have run out of lives. When a player completes a level after receiving help from a friend, a 'thank you'-message can be sent to that friend, either automatically or manually. This message can contain an item of value. In some embodiments the player helping another player can get other benefits, such as special symbols or marks being displayed next to their names. Recognition is another benefit that can be awarded to players who help others.

In some embodiments, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 16:
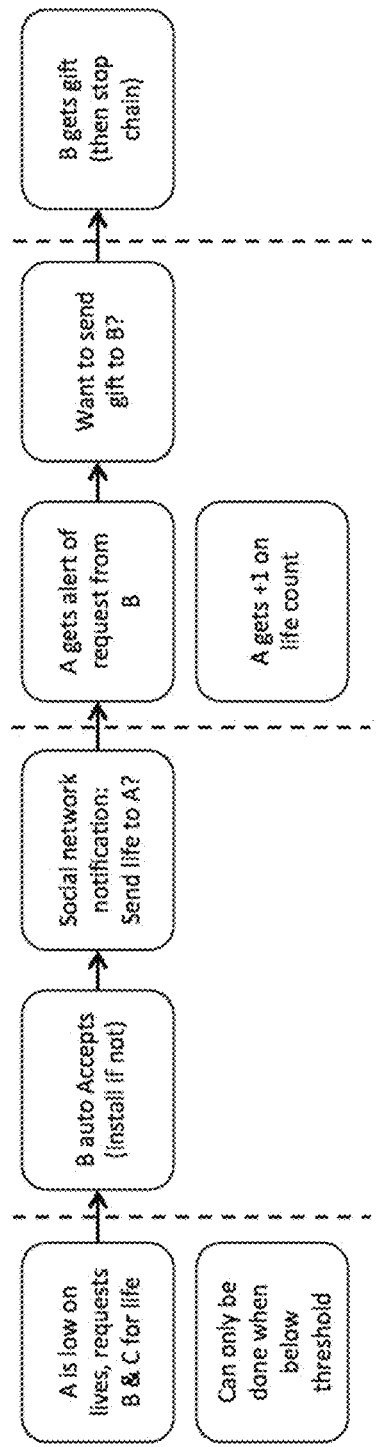
FIG. 16 schematically shows a method for the giving and/or receiving of lives.

In the mobile version of the game, the player is presented with messages when logging in. Messages that are presented can be related to the player receiving lives and friends requesting lives. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One embodiment of this chain of events is illustrated in FIG. 16.

It is also possible to buy gifts in the in-game shop and send these to friends. Such gifts are in the form of boosters that can be used either during a level or before a level.

Sending help to other players in the form of for instance extra moves and extra time—another way of helping friends is to send items that provide in-game benefits, such as extra moves or extra time depending on the level requirements in the game. In some embodiments, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some embodiments, this period of time is two days. In other embodiments, the criteria for a player being stuck is related to the amount of times they have tried and failed a level.

Figure 17:
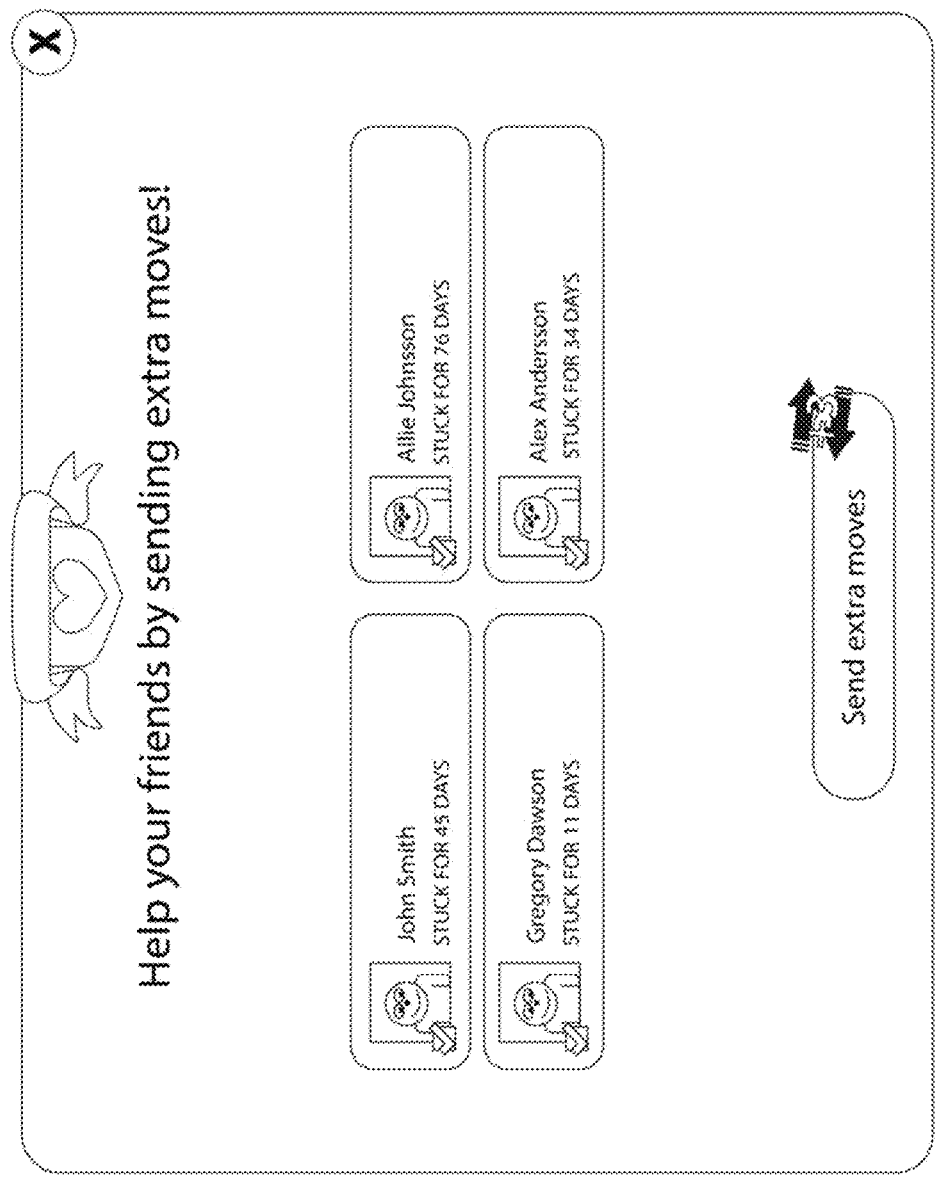
FIG. 17 shows an image displayed to a user to prompt the user to provide help to another player of the game.

The prompting from the game can happen at different points in the game, for instance when a player logs onto the game. Such prompting is illustrated in FIG. 17. The prompting increases engagement by increasing the likelihood of someone providing help to players when the game is particularly difficult, it also adds a sense of collaboration and community among players. When a player has received extra moves, it can be indicated by a symbol next to the level in which the moves can be used.

In some embodiments, the player can receive help from multiple friends. Help from multiple friends can be used at the same time or distributed over multiple occasions. When a player completes a level after receiving help from a friend, a 'thank you'-message can be sent to that friend. This message can have different embodiments, such as the ones described in the passage above about a thank-you message related to sending lives.

Head to head tournaments—the game can also be implemented to be played in a tournament mode with a limited time or limited number of moves or both over a consecutive set of levels. The score can be collected over the several levels to give the player a score for all the levels completed. The tournament mode can in some embodiments be played with a virtual map, in other embodiments the game has a special interface for head to head competition. One such embodiment can be a split-screen mode where each player can see what the other player does in real-time.

The player can in some embodiments play the game in head to head tournaments against one or several other players. The player with the highest collective score over the number of levels will be the winner in the tournament. In some embodiments the tournaments are played with real time comparisons of players' scores, in other embodiments the scores of players are compared after finishing a level.

The game can also be played in tournaments with jackpots, where the player plays the same level where the same types of game elements are used. Jackpots can be absolute or they can be given as a multiplier of a stake that the player can input.

The game can also be played in an elimination competition against other players.

Rewards and bonuses—the game can have schemes for giving rewards and bonuses to players. One reason for giving out rewards is to increase player engagement. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other embodiments, there is a daily bonus available that is gained by every player playing the game online during that day.

Some embodiments contain boosters that regenerate over time, for example a booster that can be used once every two days.

Purchasing and in-game shop—it is possible for players to make purchases in the game or through a social network connected to the game. One way of making such purchases is through the in-game shop. The shop is accessible for instance through the virtual map screen, but depending on the embodiment it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one embodiment, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some embodiments, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some embodiments, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

When playing social games, for example ones that have a connection to a social network, one issue is that some players lack friends to give a feeling of collaboration and community when playing. This may be a disadvantage for players in games where help from others are required in order to progress in the game.

Some embodiments which will now be described may addresses one or both of the following scenarios:

Social network connected players who want faster response due to few friends playing Non connected mobile players that have no means to find friends as they have chosen not to connect to a social network Some embodiments may offer players a simple way to ask players that are not friends of the player for help by posting on a bulletin board. Any player, regardless if they are friends or not (or in a social graph of the player), can choose to help other players. By helping another player, players earn the right to post for help. Also, after receiving help players have the opportunity to thank whoever helped them. This provides several benefits:

Stuck players get help faster to avoid annoyance

Non friend interaction creates potential for improved retention even without friends in the actual game Opens an opportunity for new friendships to be made The place where players can post requests for help is referred to as bulletin board, posting board or 'gazette' within this document. In some embodiments, one, more or all of the following will be supported.

Players opt in to be a part of the bulletin board, e.g. accept getting notification from/about strangers.

All players get to make for one posting for help by signing up, but a player may never have more than x open requests where x is an integer. In some embodiments, x may be 1.

The help request may not need to be filtered apart from oldest listed first, and only a selection may be viewable for a certain player.

Once a player helps someone he or she may post again. So the first free post has to be followed up by helping someone else before the next request can be made.

Players may be alerted of received help and thanks by the standard channel for the platform (typically through requests if connected to a social network and through a notification on a mobile device) as well as a flag in game.

Figure 18:
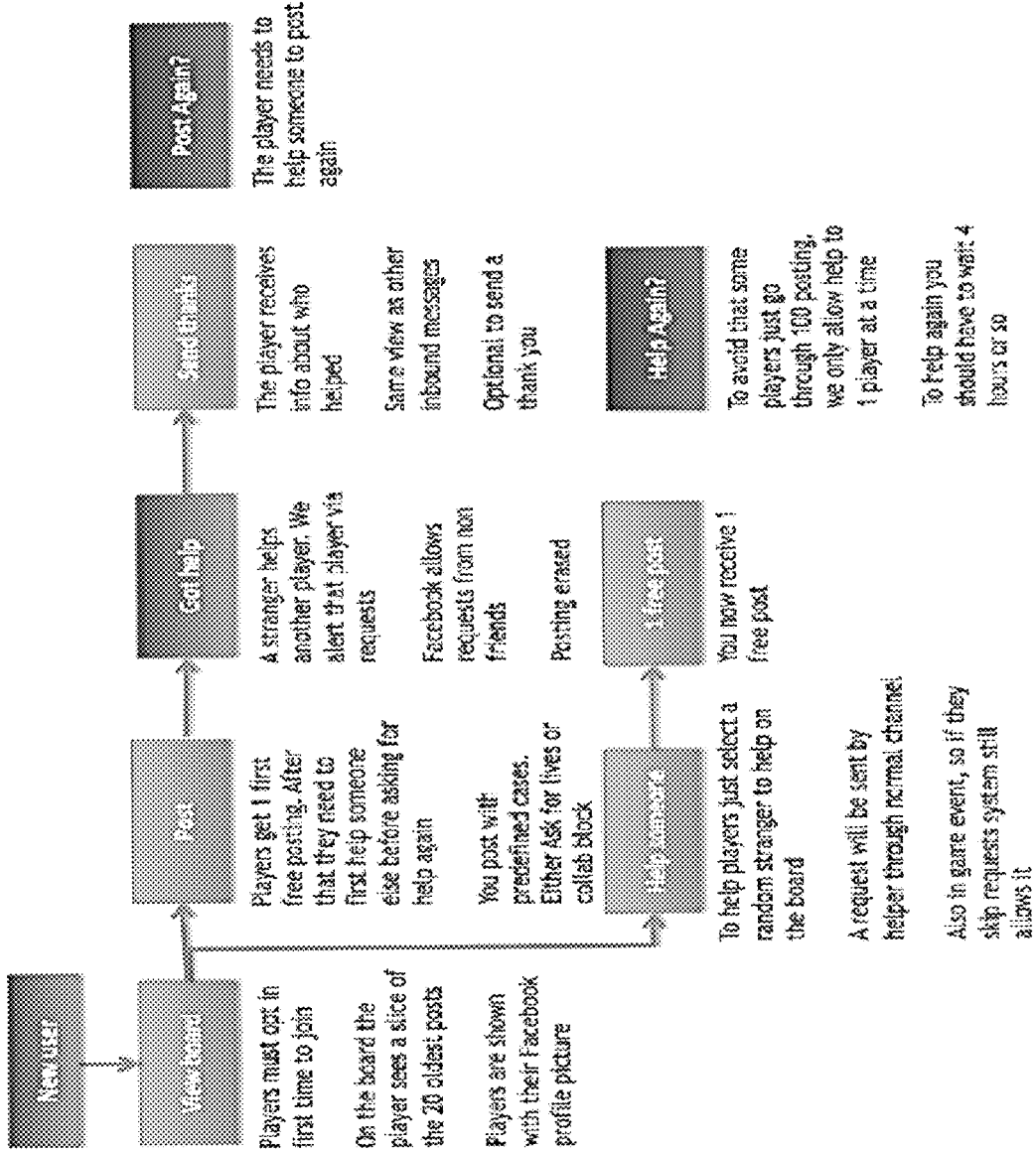
FIG. 18 is a flow chart of how help can be requested and given to other players in an embodiments.

The above characteristics are further explained in FIG. 18.

Figure 19:
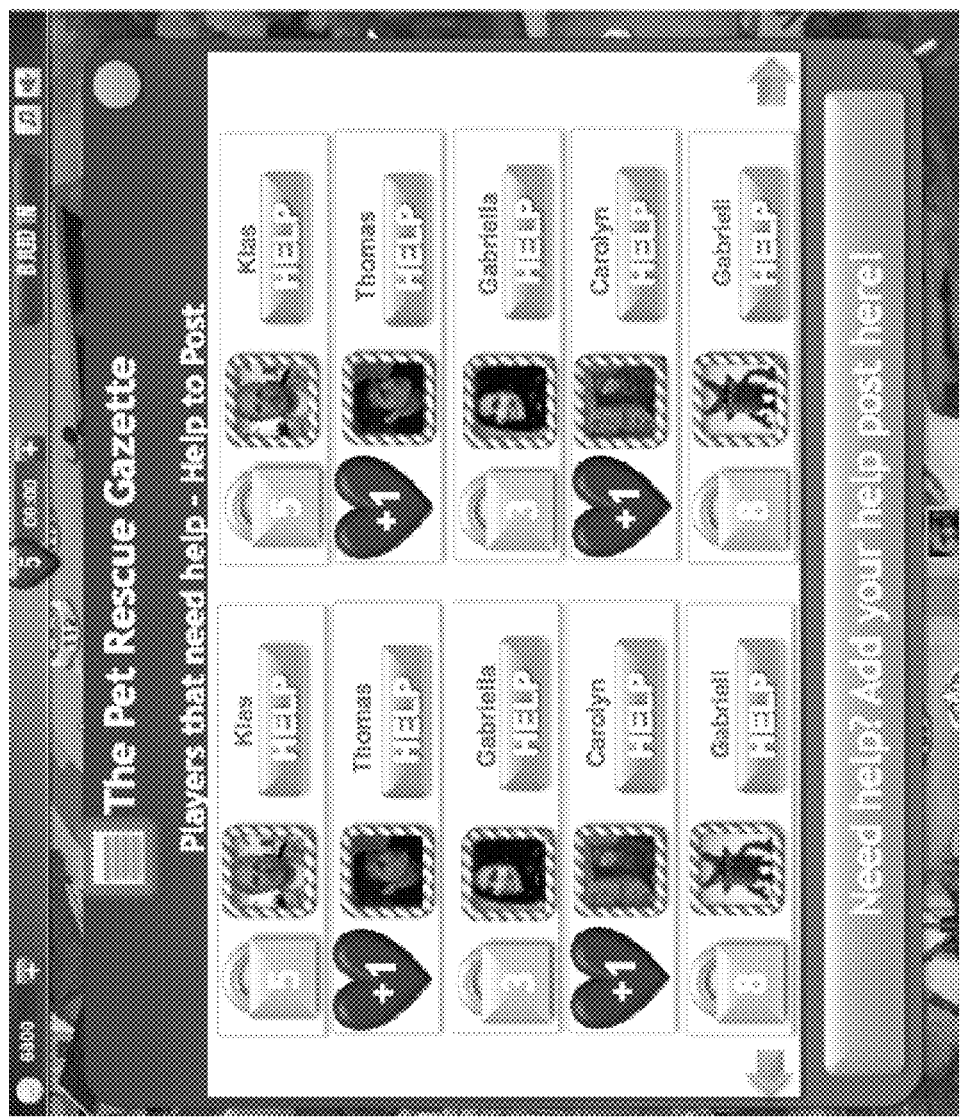
FIG. 19 shows a gazette of an embodiment.

A typical implementation of the Gazette is shown in FIG. 19.

Figure 20:
FIG. 20 shows a view of a game from which the gazette can be accessed.

Typically, the Gazette can be accessed from a map view of a game as shown in FIG. 20. The arrow 70 points to a gazette icon. It should be noted that this is just an example, it can also be accessed from other views.

Figure 21:
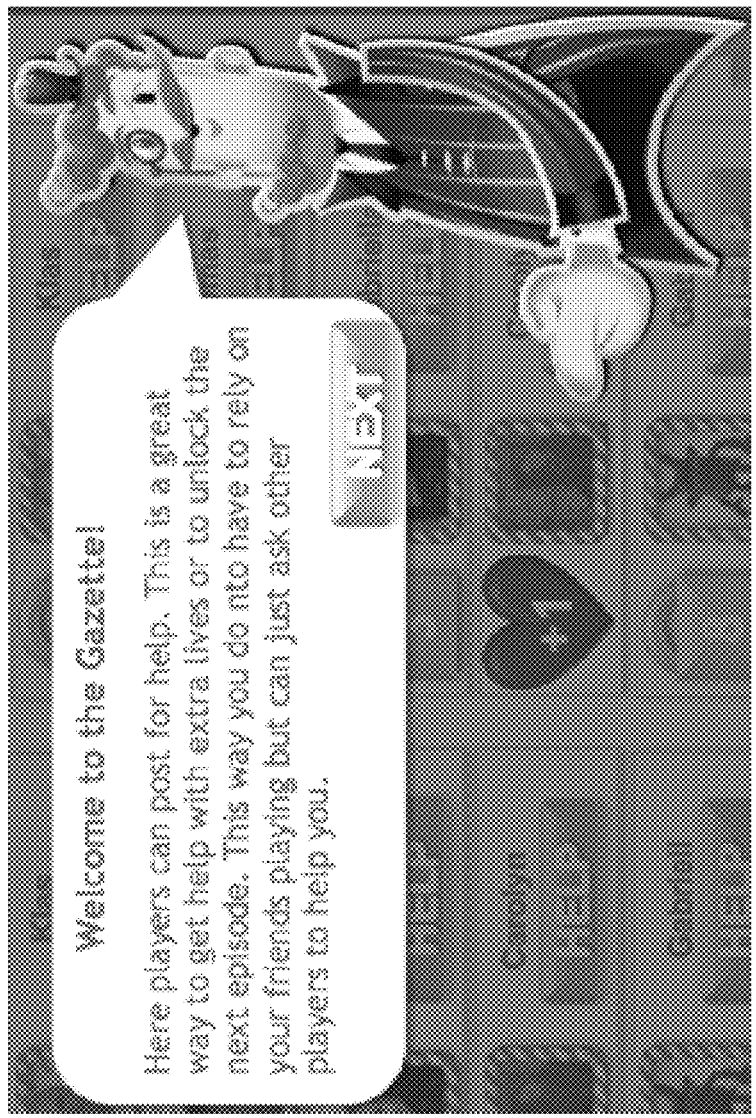
FIG. 21 shows a gazette welcome message.
Figure 22:
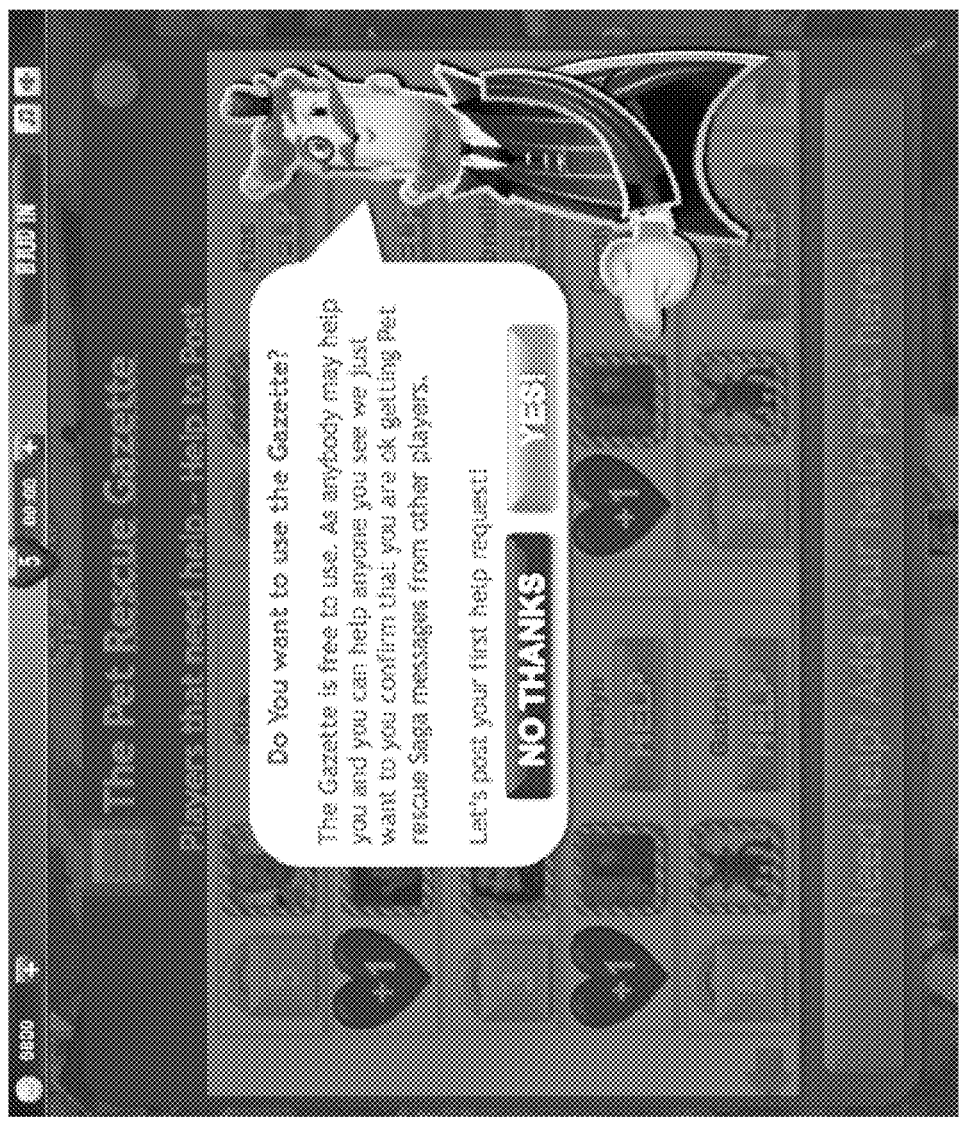
FIG. 22 shows a message asking the player whether to use the gazette or not.

When opening the gazette for the first time in a game, players may be presented with a welcoming message as shown in FIG. 21. After the welcome message, player will be given the option to use or not use the gazette which is shown in FIG. 22. In some embodiments, the player can at any time choose to start or stop using the gazette regardless of which choice they make at the beginning.

Figure 23:
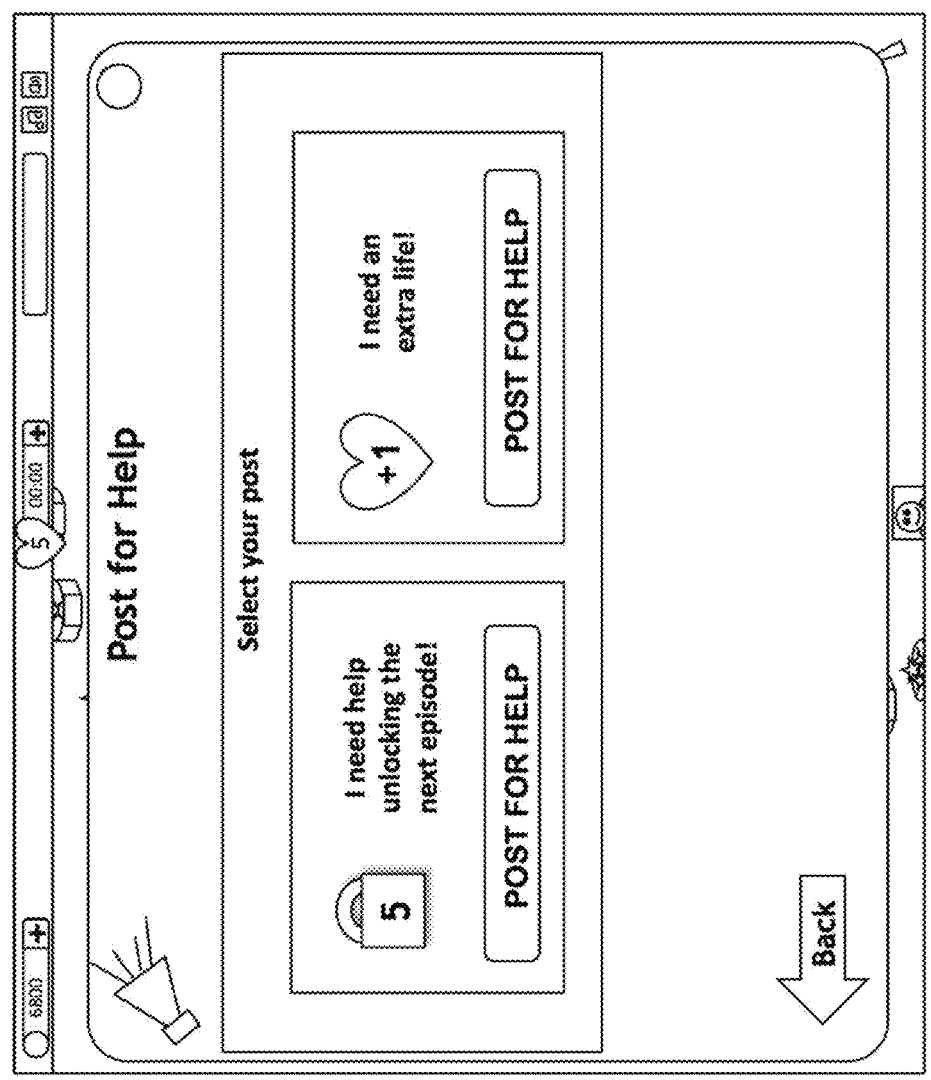
FIG. 23 shows one example of a message board for posting for help.

The player may in some implementations be given one or two options to post for help, as shown in FIG. 23. In some embodiments the list of available actions can be longer, it is however envisioned that a shorter list typically will make the choice easier for the player. Some embodiments may allow for one or more of the following:

Posting for help, simple choice of two options to keep it streamlined

Figure 24:
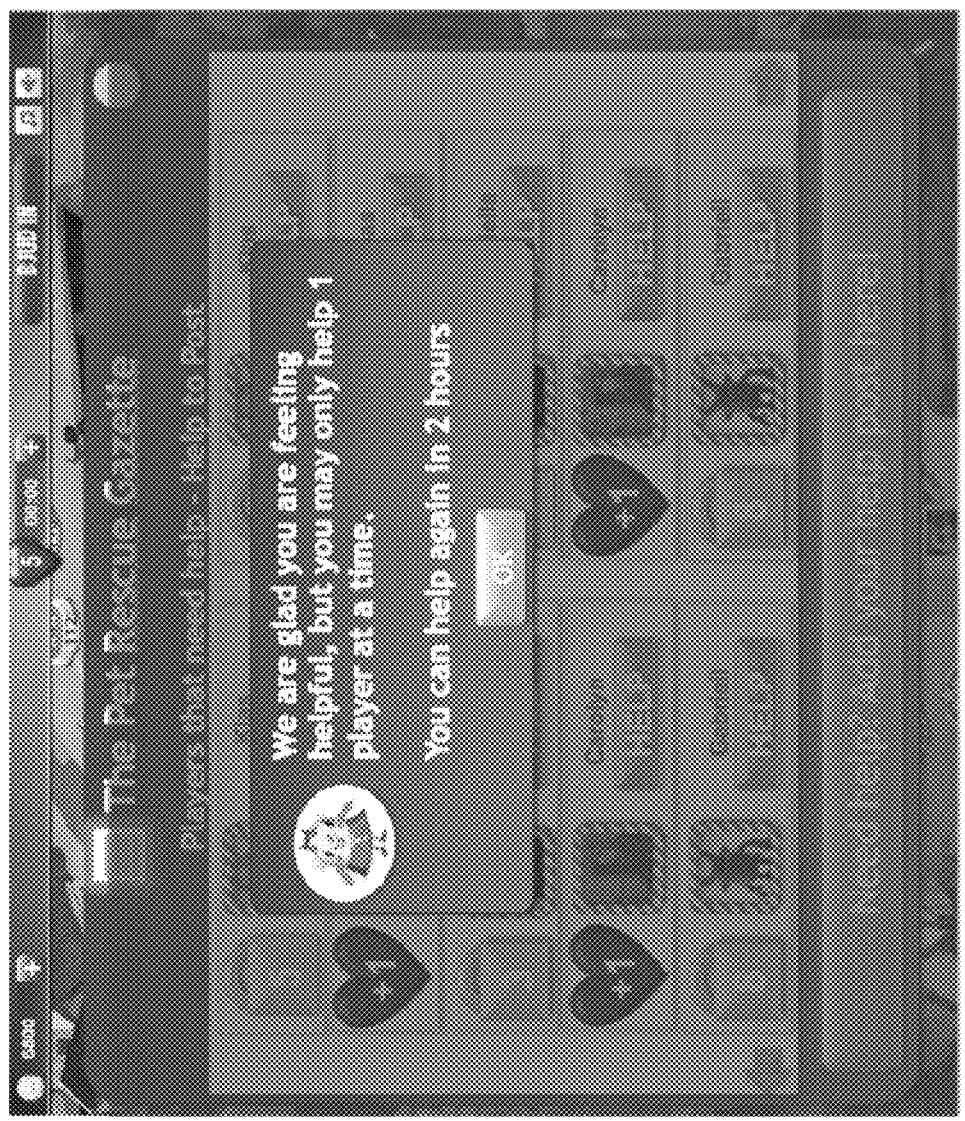
FIG. 24 shows one example of an error message associated with a message board.

If a certain post is not possible grey it out or otherwise indicate as unavailable A player may not be able to post for lives or unlock unless needed at the point of posting In some embodiments help can only be given one time in a certain time period, for instance once every two hours. When trying to help more people than the allowed threshold, a message such as the one in show in FIG. 24 is typically shown. In some embodiments, there is no need to help others in order to be able to ask for help.

Figure 25:
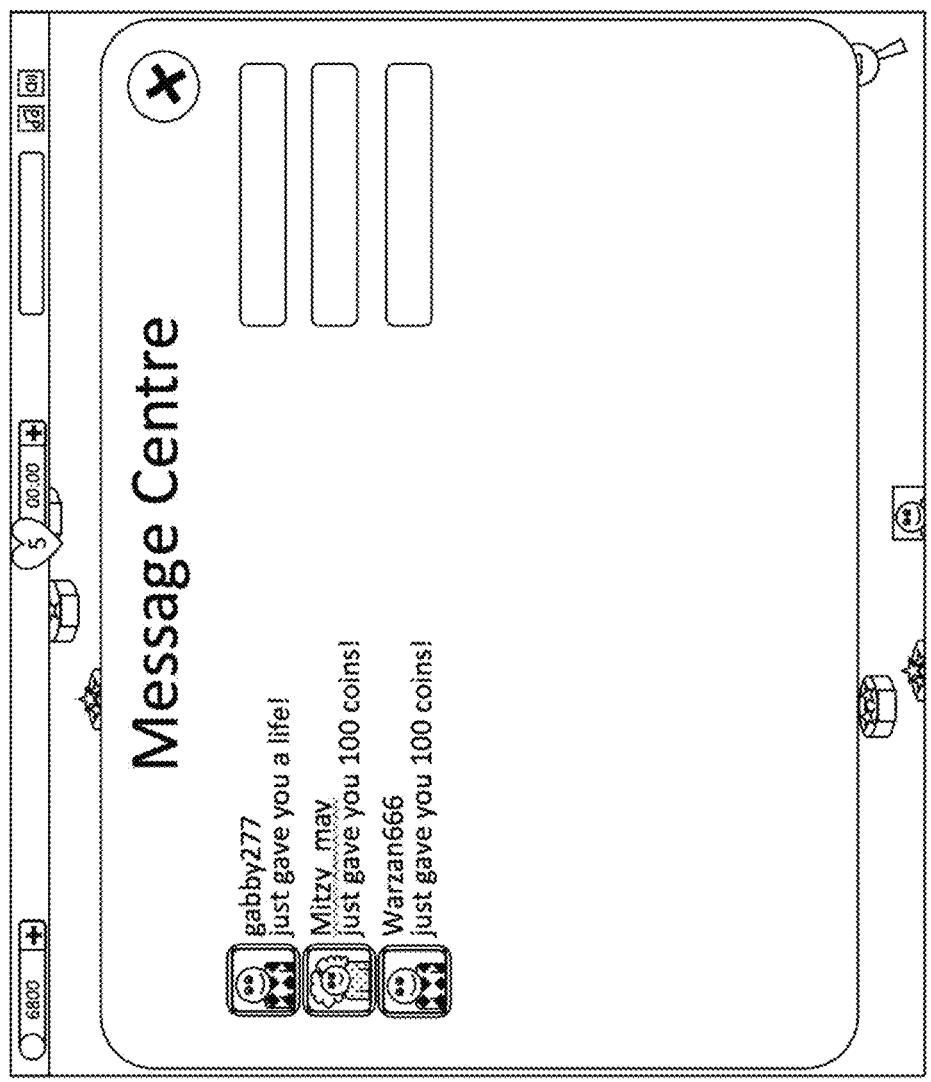
FIG. 25 shows one example of a message centre of a message board.

When a player is notified that help has been received, there will typically not be a distinction between help received from friends and non-friends. The example in FIG. 25 shows that for instance the user "Warzan666" can be a user that is not connected to the current player but has helped him out as have the other two users. Non-friends will generally appear in the messages/notifications with their name and a profile picture or avatar in the same way friends are presented. In some implementations, there will be some icon or symbol denoting that a player is either a friend or non-friend.

Figure 26:
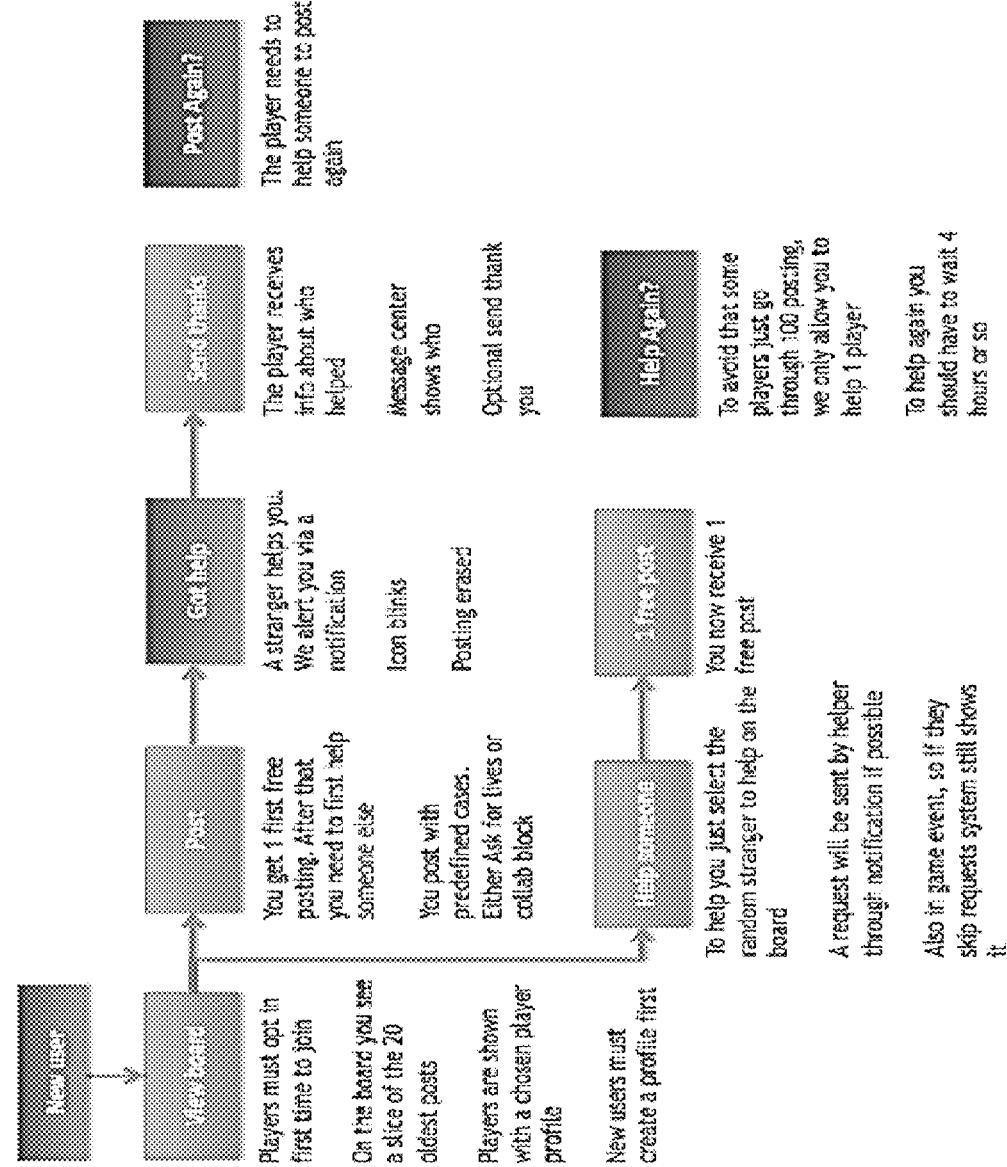
FIG. 26 shows a flow chart for requesting of help and giving of help on a device without using a social network.

In some embodiments on mobile devices, there will be players that are not connected to a social network. In these cases the flow of events will be slightly different, as shown in FIG. 26.

Figure 27:
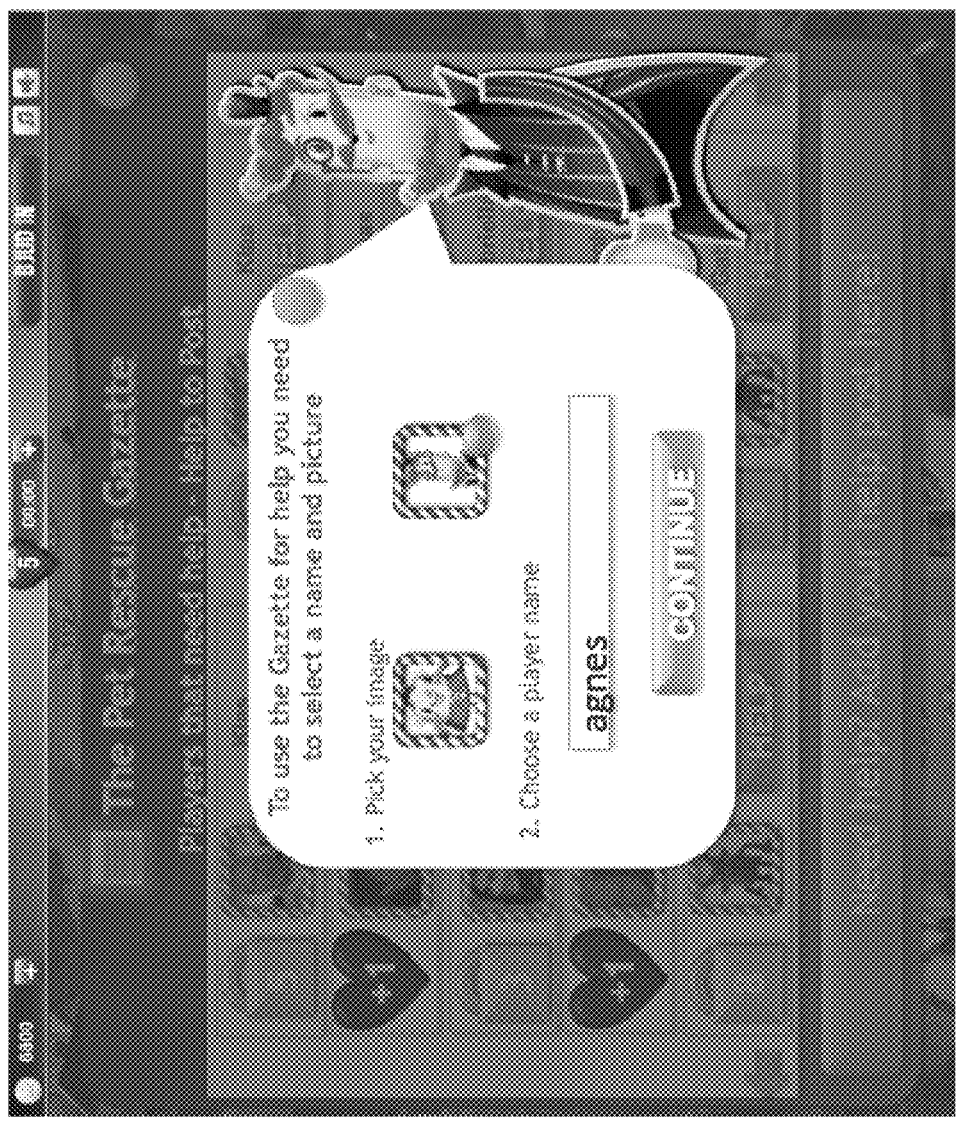
FIG. 27 illustrates typical additional steps when starting the gazette for the first time on a non-connected mobile device, since the player needs to choose a name and an image to represent them.

The gazette may work in generally the same way on a non-connected (in terms of social network) mobile device as on a device that is connected to a social network. However, there are typically two extra steps when starting it for the first time, since the player needs to choose a name and an image to represent them as shown in FIG. 27. The game system structure will assign a unique identifier to the user. That unique identifier may in some implementations be the user's chosen nickname. In some implementations the users will be assigned a unique identifier that is not shown to the user and may be used to identify the user within the game system. If the user at a later stage chooses to connect the game experience to a social network the user may merge or use the already assigned account ID to the social network assigned ID. It is understood that different IDs may be used and depending on the environment where it is implemented and based on other considerations.

Allowing non-friend interactions will likely lead to more players befriending each other, since after having helped or received help from another player some form of bond might be formed. In a typical implementation it is easy to add players who have helped to a friend list, for instance by clicking and icon labelled 'add' next to their avatars.

The game may be played on any suitable platform. Examples of platforms will now be discussed.

The first platform is Facebook. The skilled person will understand that where Facebook is referred to in this document, other social network platforms may be used. A Facebook game may be a social game, a game you play with your friends. A Facebook game may be played on the internet, after logging in to Facebook (whether automatically or manually), such as from a personal computer.

The second platform is smartphones. Use of smartphones is not always continuous. You may use a smartphone for 5 minutes on a bus, and then for 20 minutes on a connecting train, for example. The use can have many starts and stops. Not like someone working at an office desk or at a home desk in a conventional way. A smartphone can be on an iOS platform, or on an Android platform, for example.

The third platform is tablets. It can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of, such as all three of the above platforms (or more), may provide a connected fully-synchronized seamless experience. Hence multi-platform games are important. Some criteria for multi-platform games are: stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, e.g. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

Some embodiments of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical embodiment, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some embodiments, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some embodiments, players can be rewarded for playing the game on two or more platforms. For example, players that are active on a computer-based platform could get a bonus for also installing the game on a handheld device. Such bonuses may for instance be in the form of in-game currency, a booster to be used in the game or other in-game valuable object.

Players may also be rewarded for playing two or more games that are related. When choosing to play a new game, the player can receive bonuses in another game. This can be triggered by using a link from one game to the other, or by games sharing information between one and other so that it automatically detects a player that is playing more than one game and subsequently rewards them. One way of rewarding players that play a plurality of games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some embodiments, a booster bought in one game can be used in another game that shares certain features with it.

It is possible for embodiments of the game to vary depending on the location of the player. For instance, the language can be adapted and translated into different languages.

In some embodiments updates of the game are incorporated at different times in different locations, in order to not to interfere with for instance the times of the day that players are as most active.

If trying to access the game online, as opposed to starting a local version that is saved on the device, while updates are being made, the player may be provided with a message on the display saying that the game cannot be accessed at that moment.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

An appropriately adapted computer program code product or products may be used for implementing the embodiments, when loaded on an appropriate data processing apparatus. The program code product for providing the operation may be stored on, provided and embodied by means of an appropriate carrier medium. An appropriate computer program can be embodied on a computer readable record medium. A possibility is to download the program code product via a data network.

In general, the various embodiments may be implemented in hardware or special purpose circuits, software, logic or any combination thereof.

Embodiments may thus be practiced in various components such as integrated circuit modules.

It is also noted herein that while the above describes embodiments, there are several variations and modifications which may be made to the disclosed solution without departing from the scope of the present invention.

The invention claimed is:

1. A computer device, having at least one processor, comprising:
a user interface configured to receive a first input from a user to select one of at least a first progress path and a second progress path through a computer implemented game as an active path, each of said first and second progress paths comprising a plurality of different game levels in an ordered sequence, wherein there is a one to one correspondence of at least one game level in the second progress path with a respective corresponding game level in the first progress path, wherein to progress along the second progress path requires at least a first preceding level in the second progress path to have been completed and a game level in one to one correspondence to that first preceding game level in the first progress path also to have been completed;

a display configured to display game elements for engagement by the user via the user interface to allow the user to play the computer implemented game; and at least one processor configured, in response to second user input received via said user interface to select one of said plurality of different game levels of said active path, to cause said display to display said game elements for engagement by the user via the user interface to allow the user to play the computer implemented game.

2. The computing device as claimed in claim 1, comprising a memory, the game levels in one to one correspondence of the first and second progress paths comprising at least a portion of common computer executable code, wherein said code comprises level characteristics, said memory being configured to store said code.

3. The computing device as claimed in claim 1, wherein the at least one processor is configured to provide, when the computer implemented game is played, each of the plurality of different game levels on one of the first and second progress paths with at least one additional goal as compared to a respective game level in one to one correspondence thereto on the other of said first and second progress paths.

4. The computing device as claimed in claim 3, wherein the at least one processor is configured to cause the display to display said game elements in a game board, each game element of said game elements having one of a plurality of different characteristics, the user interface being configured to receive third user input and the at least one processor being configured in response to said third user input to cause at least one game element of said game elements to be removed from said game board and said additional goal comprises balancing a number of removed game elements with one characteristic with a number of removed game elements of a different characteristic.

5. The computing device as claimed in claim 4, wherein said different characteristics comprise different colors.

6. The computing device as claimed in claim 1, wherein when the second progress path is displayed, it is displayed in a visually opposite manner as compared to when the first progress path is displayed.

7. The computing device as claimed in claim 1, wherein the second progress path is displayed so as to be a mirror image of the first progress path as compared to when said first progress path is displayed.

8. The computing device as claimed in claim 1, wherein the at least one processor is configured to allow the user to access at least one of said first and second progress paths only if the at least one processor determines that one or more criteria is satisfied.

9. The computing device as claimed in claim 8, wherein said one or more criteria comprises one or more of:

a number of levels have been completed, a number of other users have been beaten, a number of rewards for completing one or more levels; and a given score.

10. The computing device as claimed in claim 1, at least one processor is configured to provide said second progress path only after n levels of the first progress path has been completed.

11. The computing device as claimed in claim 1, wherein the at least one processor is configured such that at least one of said first and second progress paths comprises a plurality of stages, each stage comprising a plurality of levels and each stage having at least one criteria for unlocking each stage in addition to completion of levels in a preceding stage.

12. The computing device as claimed in claim 11, at least one criteria comprises one or more of:

a number of levels having been completed, a number of other users having been beaten, a number of rewards for completing one or more levels; and a given score.

13. The computing device as claimed in claim 1, wherein said user interface and said display are provided by a touch screen.

14. The computing device as claimed in claim 1, at least one processor is configured to determine which of said first and second progress paths through the computer implemented game is the active path and to cause the display to display the active path.

15. The computing device as claimed in claim 14, at least one processor is configured to determine which of said plurality of different game levels in said active path are available and to cause the display to display the active path with an indication as to which of said plurality of different game levels are available for the user to play.

16. The computing device as claimed in claim 14, wherein the at least one processor is configured to cause the display to display only the active path.

17. The computer device as claimed in claim 1, at least one processor is configured to cause said display to display at least one icon associated with a respective one of said first and second progress paths and responsive to said user interface receiving said first user input to select one of said at least one icons, causing said respective one of said first and second progress paths to be said active path.

18. The computer device as claimed in claim 1, wherein progress in the first progress path is independent of progress in the second progress path.

19. A computer implemented method, the method comprising the following steps implemented by a computer device having at least one processor, a display and a user interface:

receiving a first input from a user via the user interface to select one of at least a first progress path and a second progress path through a computer implemented game as an active path, each of said first and second progress paths comprising a plurality of different game levels in an ordered sequence, wherein there is a one to one correspondence of at least one game level in the second progress path with a respective corresponding game level in the first progress path, wherein to progress along the second progress path requires at least a first preceding level in the second progress path to have been completed and a game level in one to one correspondence to that first preceding game level in the first progress path also to have been completed;

displaying, in response to second user input received via the user interface to select one of said plurality of different game levels of said active path, game elements for engagement by the user via the user interface to allow the user to play the computer implemented game.

20. The computer implemented method as claimed in claim 19, comprising providing each of the plurality of different game levels on one of the first and second progress paths with at least one additional goal as compared to a respective game level in one to one correspondence thereto on the other of said first and second progress paths.

21. The computer implemented method as claimed in claim 19, comprising:

determining which of the first and second progress paths through the computer implemented game is the active path;

determining which one or more of said plurality of different game levels are available to play; and causing the display to display the active path with an indication as to which game levels are available for the user to play.

22. A computer device having:

a user interface configured to receive first input from a user to select one of at least a first progress path and a second progress path through a computer implemented game as an active path, each of said first and second progress paths of said computer implemented game comprising a plurality of game levels of the computer implemented game;

a display; and at least one processor configured, in response to second user input received via said user interface to select one of said plurality of game levels, to cause said display to display game elements for engagement by the user via the user interface to allow the user to play the computer implemented game in a game board, each game element of said game elements having one of a plurality of different characteristics, the user interface being configured to receive third user input and the at least one processor being configured in response to said third user input to cause at least one game element of said game elements to be removed from said game board and a goal comprises balancing a number of removed game elements with one characteristic with a number of removed game elements of a different characteristic.

23. A computer implemented method, the method comprising the following steps implemented by a computer device having at least one processor, a display and a user interface:

receiving first input from a user via the user interface to select one of a plurality of game levels of a computer implemented game;

causing by the at least one processor, in response to the first user input, said display to display game elements for engagement by the user via the user interface to allow the user to play the computer implemented game in a game board, each game element of said game elements having one of a plurality of different characteristics; and causing by the at least one processor, in response to second user input received via said user interface, at least one game element of said game elements to be removed from said game board, wherein a goal of said selected game level comprises balancing a number of removed game elements with one characteristic with a number of removed game elements of a different characteristic.

* * * * *